United States Patent
Anderson

(10) Patent No.: US 12,212,128 B2
(45) Date of Patent: Jan. 28, 2025

(54) BOX AND CONDUIT HANGER

(71) Applicant: ERICO International Corporation, Solon, OH (US)

(72) Inventor: Scott Ernest Anderson, Garrettsville, OH (US)

(73) Assignee: BRICO International Corporation, Solon, OH (US)

( * ) Notice: Subject to any disclaimer, the term of this patent is extended or adjusted under 35 U.S.C. 154(b) by 0 days.

(21) Appl. No.: 18/508,466

(22) Filed: Nov. 14, 2023

(65) Prior Publication Data

US 2024/0079864 A1 Mar. 7, 2024

Related U.S. Application Data

(63) Continuation of application No. 17/503,474, filed on Oct. 18, 2021, now Pat. No. 11,817,688.

(60) Provisional application No. 63/093,585, filed on Oct. 19, 2020.

(51) Int. Cl.
| | |
|---|---|
| H02G 3/32 | (2006.01) |
| H02G 3/08 | (2006.01) |
| H02G 3/10 | (2006.01) |
| H02G 3/20 | (2006.01) |

(52) U.S. Cl.
CPC ............... *H02G 3/081* (2013.01); *H02G 3/10* (2013.01); *H02G 3/20* (2013.01); *H02G 3/32* (2013.01)

(58) Field of Classification Search
CPC ............ H02G 3/081; H02G 3/10; H02G 3/20; H02G 3/32
USPC ........................................................ 174/520
See application file for complete search history.

(56) References Cited

U.S. PATENT DOCUMENTS

| | | | |
|---|---|---|---|
| 535,495 | A | 3/1895 | Graham |
| 2,532,528 | A | 12/1950 | Zuley |
| 2,632,620 | A | 3/1953 | Hurley |
| 2,711,876 | A | 6/1955 | Goebel |
| 2,736,528 | A | 2/1956 | Le Brock |
| 2,758,810 | A | 8/1956 | Good |
| 2,936,991 | A | 5/1960 | Picha et al. |

(Continued)

FOREIGN PATENT DOCUMENTS

| | | |
|---|---|---|
| CN | 202696068 U | 1/2013 |
| CN | 203312476 U | 11/2013 |

(Continued)

OTHER PUBLICATIONS

Product data sheet for BCHS-12, Box and Conduit Hanger Support, downloaded Jan. 20, 2022 from https://www.orbitelectric.com/bchs-12.html.

(Continued)

*Primary Examiner* — Timothy J Thompson
*Assistant Examiner* — Michael F McAllister
(74) *Attorney, Agent, or Firm* — Quarles & Brady LLP

(57) ABSTRACT

A support for electrical boxes can include a body plate, first and second mounting arms, and first and second side flanges. The body plate can include mounting features configured to secure an electrical box to the body plate. The first and second mounting arms can extend from the body plate and receive a threaded rod to support the body plate in a horizontal orientation. The first and second side flange extend from opposing sides of the body and include an aperture to receive a threaded rod that can support the body plate in a vertical orientation.

19 Claims, 24 Drawing Sheets

(56) References Cited

U.S. PATENT DOCUMENTS

| | | |
|---|---|---|
| 3,131,901 A | 5/1964 | Coleman |
| 3,190,604 A | 6/1965 | Jorgensen et al. |
| 3,192,380 A | 6/1965 | Eglowstein |
| 4,518,138 A | 5/1985 | Stutenkemper et al. |
| 5,085,392 A | 2/1992 | Perna |
| 5,253,831 A | 10/1993 | Theodorides |
| 5,346,165 A | 9/1994 | Frean et al. |
| 5,354,952 A | 10/1994 | Hickey |
| 5,478,033 A | 12/1995 | Hungerford, Jr. |
| 5,697,585 A | 12/1997 | Hungerford, Jr. |
| 5,698,820 A | 12/1997 | Collard |
| 5,794,896 A | 8/1998 | Hungerford, Jr. |
| 5,883,332 A | 3/1999 | Collard |
| D449,218 S | 10/2001 | Vrame |
| 6,345,800 B1 | 2/2002 | Herst et al. |
| 6,491,270 B1 | 12/2002 | Pfaller |
| 6,692,584 B2 | 2/2004 | Sakata et al. |
| D531,010 S | 10/2006 | Vrame |
| 7,154,040 B1 | 12/2006 | Tompkins |
| 7,234,674 B2 | 6/2007 | Rippel et al. |
| 7,377,472 B2 | 5/2008 | Brown et al. |
| 7,500,762 B2 | 3/2009 | Kassay et al. |
| 7,673,841 B2 | 3/2010 | Wronski |
| 7,699,283 B2 | 4/2010 | Vrame et al. |
| 7,735,795 B2 | 6/2010 | Wronski |
| 7,797,074 B2 | 9/2010 | Hyatt et al. |
| 8,047,491 B2 | 11/2011 | Gutierrez |
| 8,091,721 B1 | 1/2012 | Gretz |
| 8,240,630 B2 | 8/2012 | Wronski |
| 8,424,827 B2 | 4/2013 | Dinh |
| 8,622,361 B2 | 1/2014 | Wronski |
| 8,820,686 B2 | 9/2014 | Hickle et al. |
| 9,004,435 B2 | 4/2015 | Wronski |
| D731,292 S | 6/2015 | Vrame |
| 9,057,459 B2 | 6/2015 | Krauch |
| 9,068,689 B2 | 6/2015 | Hickle et al. |
| D756,750 S | 5/2016 | Vrame et al. |
| 9,568,123 B2 | 2/2017 | Zhang et al. |
| 9,667,047 B1 | 5/2017 | Vrame |
| 9,667,050 B1 * | 5/2017 | Vrame ................ H02G 3/0616 |
| 9,689,541 B2 | 6/2017 | Wronski |
| 9,696,021 B2 | 7/2017 | Wronski |
| D804,934 S | 12/2017 | Vrame |
| 10,527,203 B2 | 1/2020 | Dafonseca et al. |
| 2005/0247842 A1 | 11/2005 | Wronski |
| 2009/0173865 A1 * | 7/2009 | Vrame .................... H02G 3/20 248/343 |
| 2010/0288554 A1 | 11/2010 | Jafari |
| 2015/0144371 A1 * | 5/2015 | Korcz ................... H02G 3/125 174/61 |
| 2015/0226375 A1 * | 8/2015 | Zhang ................... H02G 3/081 248/225.11 |
| 2020/0080665 A1 | 3/2020 | Dafonseca et al. |
| 2020/0096137 A1 | 3/2020 | Dafonseca et al. |
| 2021/0218236 A1 * | 7/2021 | Beristany ............... H02G 3/381 |

FOREIGN PATENT DOCUMENTS

| | | |
|---|---|---|
| CN | 203787883 U | 8/2014 |
| CN | 206159662 U | 5/2017 |
| CN | 108321742 A | 7/2018 |
| CN | 208078586 U | 11/2018 |
| CN | 209730677 U | 12/2019 |
| DE | 102004032053 B4 | 12/2007 |
| EP | 2494245 B1 | 1/2014 |
| JP | H06-194543 A | 7/1994 |

OTHER PUBLICATIONS

Product data sheet for BCHS-6—Box and Conduit Hanger Support, downloaded Jan. 20, 2022 from https://www.orbitelectric.com/steel-products/hanging-and-support/box-and-conduit-hanger-support/bchs-6.html.

Product data sheet for BCHS-6S—Box and Conduit Hanger Support, downloaded Jan. 20, 2022 from https://www.orbitelectric.com/prefab-products/box-and-conduit-hanger-support/bchs-6s.html.

* cited by examiner

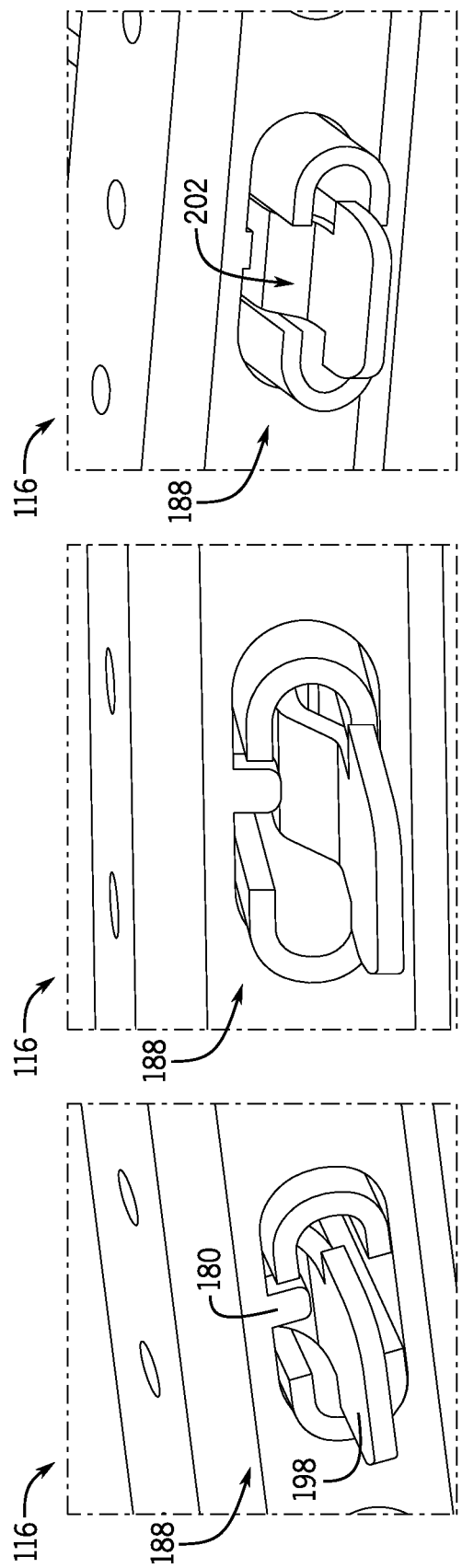

BOX AND CONDUIT HANGER

CROSS-REFERENCE TO RELATED APPLICATIONS

This application is a continuation of U.S. application Ser. No. 17/503,474, filed Oct. 18, 2021, which claims priority to U.S. Provisional Patent Application No. 63/093,585, filed Oct. 19, 2020, all of which are incorporated herein by reference in their entireties.

BACKGROUND

In many applications, it may be useful to support and secure electrical boxes and other components. For example, in some instances, electrical boxes may be required to be secured within a ceiling structure or wall along with electrical cables or conduits for power transmission to and from the electrical box.

SUMMARY

Some embodiments of the invention provide a support for electrical boxes. The support can include a body plate that includes one or more mounting features that can secure an electrical box to the body plate. The support can include first and second mounting arms that extend from the body plate to support a threaded fastener. The threaded fastener can be disposed to receive a threaded rod to support the body plate in a horizontal orientation (e.g., in which the body plate is oriented to support the electrical box with a front opening of the electrical box facing in a first direction). The support can include first and second side flanges extending on first and second opposing sides of the body plate. The first and second flanges can include an aperture that is configured to receive a threaded rod to support the body plate in a vertical direction (e.g., in which the body plate is oriented to support the electrical box with the front opening of the electrical box facing in a second direction perpendicular to the first direction).

Some embodiments of the invention provide a clamp for securing cables or conduits. The clamp can include a clamp portion. The clamp portion can include one of an integrally formed clamp tab that is configured to secure a separate conduit clamp to the clamp portion or first and second clamp arms that are movable to engage conduits or cables of different sizes. Each of the first and second clamp arms can include a toothed profile that is configured to engage one or more conduits and cables. Each of the first and second clamp arms can include a free end with a clamp tab. The clamp tab can be configured to be manually engaged to close the clamp portion around the one or more conduits or cables.

In some embodiments, a support for electrical boxes can include first and second side flanges. One or more of the first or second side flanges can include a first plurality of slots to selectively receive one or more clamps.

In some embodiments, a support for electrical boxes can include a clamp. The clamp can include a slide portion sized to be slidably received in any of a plurality of slots. A clamp portion of the clamp can include first and second clamp arms that are moveable to engage conduits or cables of different sizes.

In some embodiments, a support for electrical boxes can include a clamp having first and second clamp arms. Each of the first and second clamp arms can include a toothed profile configured to engage one or more conduits or cables and a free end with a clamp tab configured to be manually engaged to close the clamp portion around the one or more conduits or cables.

In some embodiments, a support for electrical boxes can include a clamp that includes a toothed strap on a first clamp arm and a strap opening on a second clamp arm. The toothed strap can be configured to extend through the strap opening as a clamp portion of the clamp is closed to secure the clamp portion around one or more conduits or cables, to provide a toothed engagement with the second clamp arm, at any of a plurality of locations along the toothed strap and thereby secure the first and second clamp arms in a closed configuration.

In some embodiments, a support for electrical boxes can include clamp that includes a slide portion. The slide portion can include a slide channel and a locking arm within the slide channel. The slide channel can be sized to be slidably received in any of a plurality of slots. The slots can be formed in the support.

In some embodiments, a support for electrical boxes can include a clamp having a locking arm that includes a plurality of openings. The openings can be arranged to secure the clamp with a clamp portion at a plurality of distances from a body plate of the support.

In some embodiments, a support for electrical boxes can include a clamp with one or more openings disposed on one or more ramped portions of a locking arm of the clamp. The one or more ramped portions can be ramped to cause the locking arm to deflect as a slide portion of the clamp is slid into one of a first plurality of slots of the support, to align an associated one of the one or more openings to be engaged by one of a plurality of tabs disposed within the first plurality of slots.

In some embodiments, a support for electrical boxes can include a clamp having a locking arm that is cantilevered relative to a slide channel of the clamp, biased toward engagement with tabs disposed within a plurality of slots of the support, and manually moveable to selectively release the tabs from one or more openings of the locking arm.

In some embodiments, a support for electrical boxes can include first and second mounting arms that are collectively oriented at an oblique angle relative to first and second side flanges of the support. The first and second mounting arms can be disposed on a body plate of the support in alignment with aperture of the first and second side flanges so that a threaded rod passing through the apertures extends between the first and second mounting arms.

In some embodiments, a support for an electrical box can include first and second mounting arms that are disposed on the body plate in alignment with the apertures on first and second side flanges so that a threaded rod passing through the apertures on the first and second side flanges extends between the first and second mounting arms.

In some embodiments, a support for electrical boxes can include third and fourth side flanges extending on third and fourth opposing sides of the body plate. Each of the third and fourth side flanges can include an aperture configured to receive a threaded rod to support a body plate of the support in a second vertical orientation that is rotated 90 degrees relative to a first vertical orientation.

Some embodiments of the invention provide a support for supporting an electrical box. The body plate can include a mount surface, first and second opposing side flanges, and first and second mounting arms. The first and second opposing side flanges can have respective first and second apertures configured to receive a support rod to support the body plate and electrical box in a first vertical orientation. The first and second mounting arms can extend from the mount surface and can be collectively oriented at an oblique angle relative to the first and second opposing side flanges so that the support rod extends between the first and second mounting arms in the first vertical orientation.

In some embodiments, a body plate for supporting an electrical box can include third and fourth opposing side flanges having respective third and fourth apertures configured to receive a support rod to support the body and electrical box in a second vertical orientation. First and second mounting arms can be collectively oriented at an oblique angle relative to the third and fourth opposing side flanges so that the support rod extends between the first and second mounting arms in the second vertical orientation.

In some embodiments, a body plate for supporting an electrical box can include a first and second mounting arms. A first bent portion of the first mounting arm can overlap with a second bent portion of the second mounting arm at a location that is spaced apart from a mount surface of the body plate. At least one of the first and second bent portions can secure a threaded fastener to the body plate. The threaded fastener can be configured to secure the body plate and electrical box in a horizontal orientation.

In some embodiments, a body plate for supporting an electrical box can include a mounting arm with a first bent portion that secures a threaded fastener to the body plate and includes one or more windows. A second bent portion of a second mounting arm can include one or more fingers that can be aligned with the one or more windows, the one or more fingers can be configured to extend through the one or more windows to secure the threaded fastener against rotation when a threaded rod is received through the first and second mounting arms and a nut is tightened onto the second bent portion.

In some embodiments, a body plate for supporting an electrical box can include a second bent portion opposite a first bent portion from a mount surface of the body plate.

In some embodiments, a body plate for supporting an electrical box can include first and second opposing side flanges. One or more of the first and second side flanges can define a body channel. A first wall of the body channel can include a first plurality of slots and a second wall of the body channel can include a second plurality of slots aligned with the first plurality of slots to selectively receive one or more clamps having a ratcheting mechanism.

In some embodiments, a body plate for supporting an electrical box can include one or more slots having corresponding internal tabs configured to engage a clamp received in one or more of the slots to secure the clamp to the body plate.

In some embodiments, a support for supporting an electrical box can include a body plate and a clamp with a clamp portion that includes an integrally formed strap having a plurality of teeth configured to ratchet a first clamp arm relative to a second clamp arm. The clamp can include a slide portion sized to be slidably received at an opposing side flange of the body plate.

In some embodiments, a support for supporting an electrical box can include a clamp having a clamp portion that is configured to be manually engaged to close the clamp around one or more conduits or cables.

Some embodiments can provide a method of supporting an electrical box. An electrical box can be secured to a mount surface of a body plate of a support, the support further including a first side flange having a first aperture, a second side flange having a second aperture, a first mounting arm extending from the mount surface, and a second mounting arm extending from the mount surface, the first and second mounting arms supporting a threaded fastener. An installation orientation can be selected for the support from a plurality of orientations that includes: a first vertical orientation, in which a vertically oriented threaded rod engages the threaded fastener so that the body plate is oriented to support the electrical box with a front opening of the electrical box facing downward; and a horizontal orientation, in which the vertically oriented threaded rod extends through the first and second apertures and between the first and second mounting arms so that the body plate is oriented to support the electrical box with the front opening of the electrical box facing in a horizontal direction. The support can be installed on the vertically oriented threaded rod in the selected installation orientation.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIGS. 23A-G illustrate a process of engaging the slide portion of FIG. 22 with the body plate of FIG. 1.

DETAILED DESCRIPTION

Figure 1:
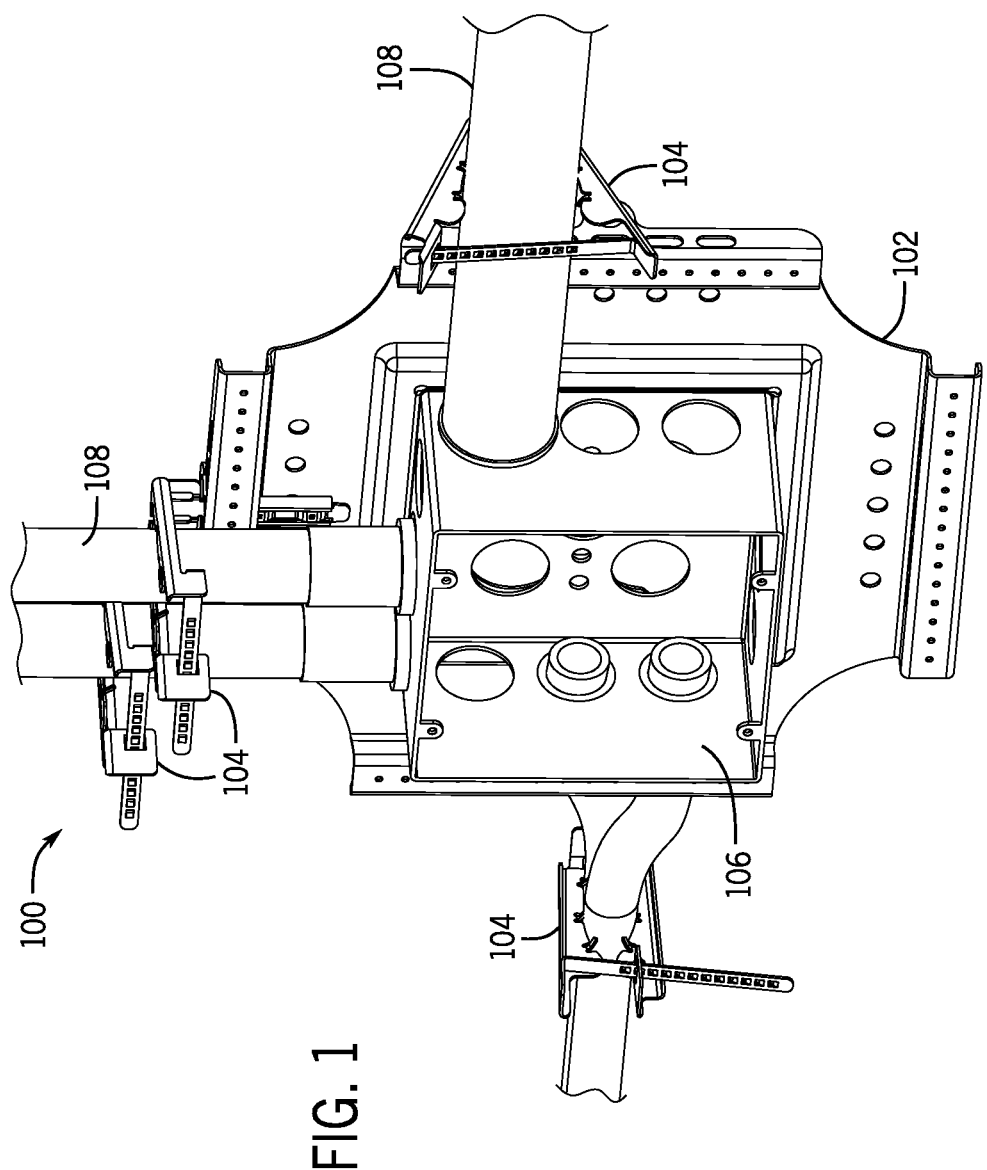
FIG. 1 is an isometric view of a support for electrical boxes, including a body plate and clamps, in a vertical orientation according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

As used herein in the context of activities or engagement of components, unless otherwise specified or limited, "manual" refers to the use of human hands. In some cases, "manual" engagement or activity can include direct manual engagement or activity: i.e., engagement or activity directly conducted by a user's hands (e.g., a user grasping or manipulating an object by hand). In some cases, "manual" engagement or activity can include engagement or activity via a non-powered hand tool (e.g., pliers).

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to secure or support electrical boxes and other components, such as conduits (e.g., plastic or metal pipes that surround wires) and cables (e.g., metal clad cables), relative to structures. For example, electrical components, such as electrical boxes, may need to be mounted in a ceiling or wall structure.

Although embodiments of the invention are presented below in the context of supports for electrical boxes, cables, and conduits other configurations are possible. The principles disclosed herein, for example, can be used with a variety of objects, including light fixtures, vents, audio devices, and so on, and can be used to secure any variety of components in place.

Generally, some embodiments of the invention can include a body plate that includes side flanges to facilitate mounting the body plate in a vertical orientation and mounting arms that facilitate mounting the body plate in a horizontal orientation. In some embodiments, clamps, such as conduit or cable clamps, can be selectively secured to the body plate at one or more side flanges. The clamps can engage the body plate at a plurality of positions relative to the body plate.

Figure 2:
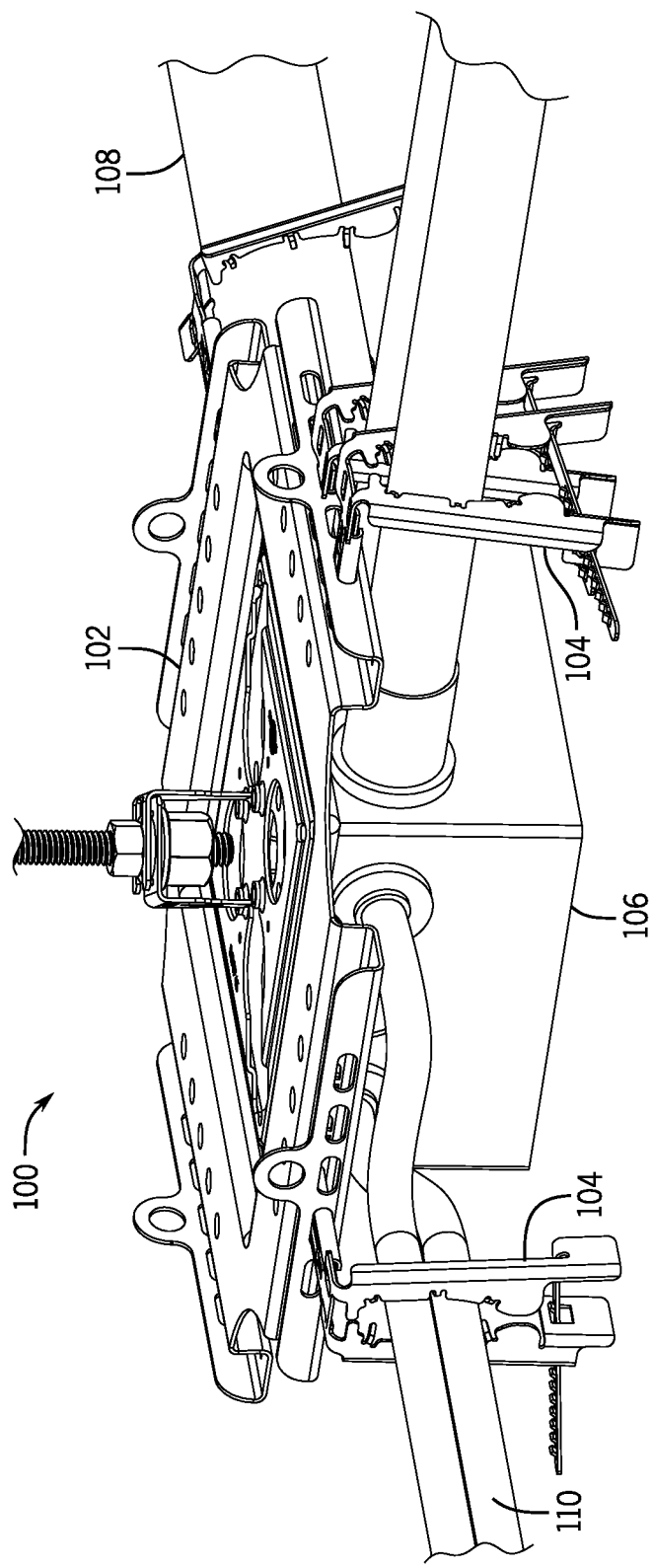
FIG. 2 is an isometric view of the support for electrical boxes of FIG. 1 in a horizontal orientation.

FIGS. 1 and 2 illustrate a box support 100 for electrical boxes according to one embodiment of the invention. The support 100 includes a body plate 102 that can selectively receive clamps 104 that extend laterally from the body plate 102. The body plate 102 can be mounted in multiple orientations relative to a reference plane, such as a ceiling, floor, or wall or other reference frame (e.g., relative to gravity). For example, FIG. 1 illustrates the body plate 102 mounted in a vertical orientation and an electrical box 106, also in a vertical orientation, secured to the body plate 102 (i.e., with primary planes of the body plate 102 and the electrical box 106 aligned along the direction of gravity). FIG. 2 illustrates the body plate 102 mounted in a horizontal orientation and the electrical box 106, also in a horizontal orientation, secured to the body plate 102 (i.e., with primary planes of the body plate 102 and the electrical box 106 aligned perpendicularly to the direction of gravity). In other installations or embodiments, however, a variety of other different configurations are possible, including multiple different configurations (e.g., rotated relative to each other by 90°) for various individual embodiments.

Generally, clamps can also be provided to secure conductors relative to an electrical box supported by a body plate. For example, the clamps 104 are configured to clamp a variety of wiring and electrical components, such as conduits and cables, for example. In particular, FIGS. 1 and 2 illustrate conduits 108 and cables 110 extending from the electrical box 106 and supported by the clamps 104. However, other support configurations are possible, such as more or less conduits and cables extending from an electrical box with more or less supports engaged with a body plate.

Figure 3:
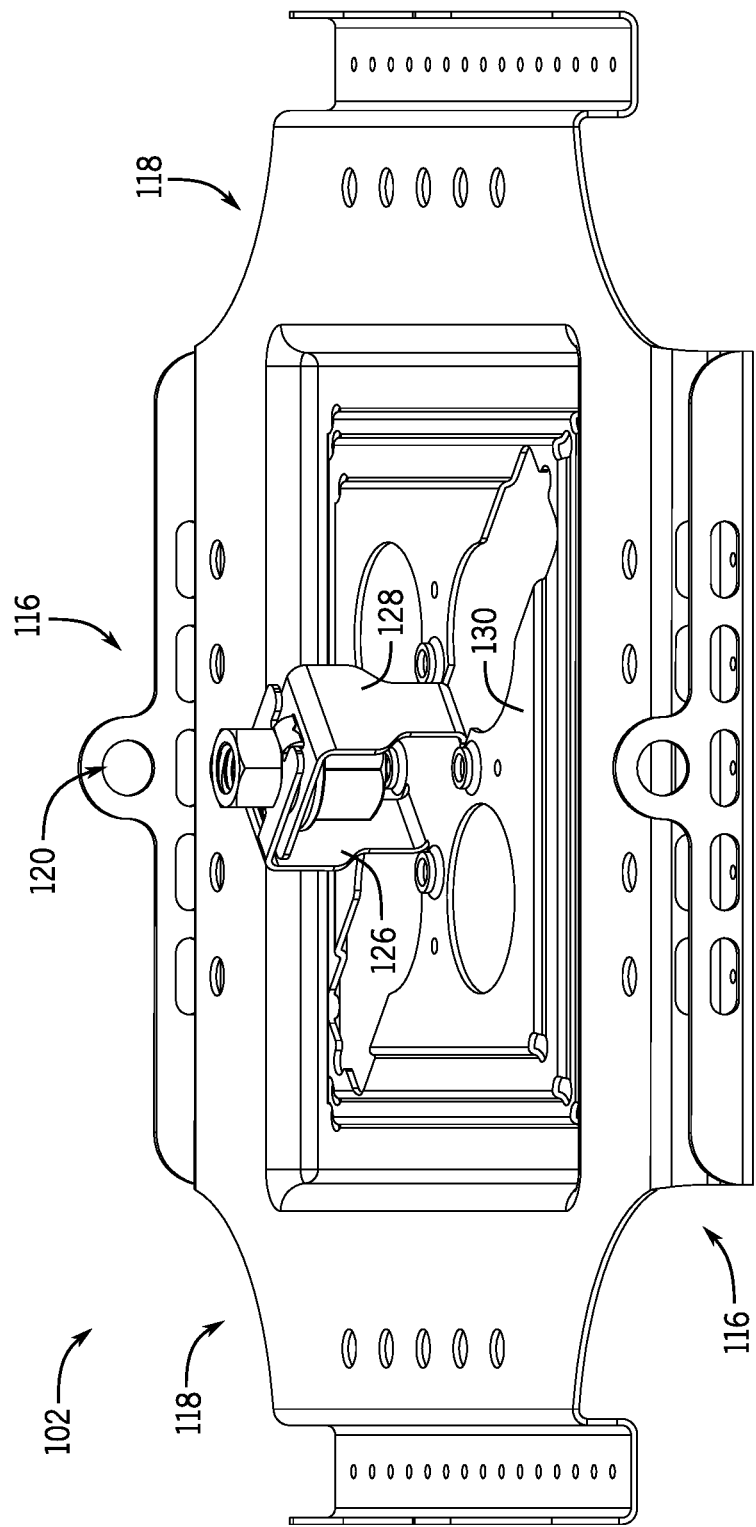
FIG. 3 is an isometric view of the body plate of FIG. 1.
Figure 4:
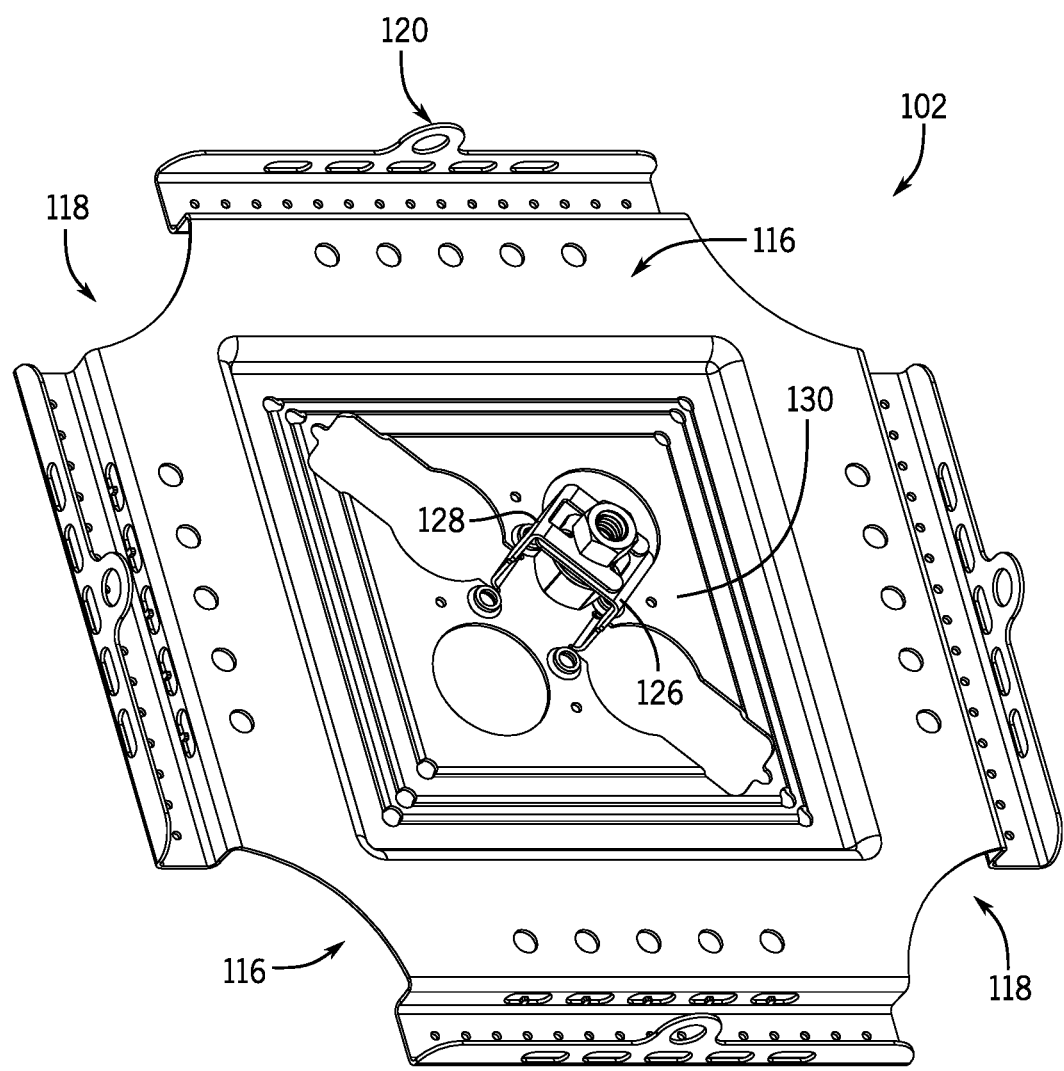
FIG. 4 is another isometric view of the body plate of FIG. 1.

FIGS. 3 and 4 illustrate further details of the body plate 102 according to some embodiments of the invention. Generally, a body plate can include one or more flanges that extend from the body plate to engage a threaded rod, one or more clamps, or other external components. In some embodiments, a flange can be formed with complex geometry (e.g., with multiple bends relative to a main body portion of a body plate) or can be formed more simply (e.g., as a single tab extending from a main body portion of a body plate). In the illustrated example, the body plate 102 includes first and second side flanges 116 that extend on opposing sides of the body plate 102. The body plate 102 further include third and fourth side flanges 118 that extend on opposing sides of the body plate 102, generally orthogonal to the first and second side flanges 116. Each of the first and second side flanges 116 and the third and fourth side flanges 118 are substantially identical (i.e., formed using the same manufacturing process to the same specification). As a result, the description of the first and second side flanges 116 can be applied to the third and fourth side flanges 118. However, in some embodiments, a body plate may only include first and second side flanges. Further, in some embodiments, flanges on one or more sides may be formed differently (e.g., with different geometries) than flanges on one or more other sides of a body plate.

In some embodiments, one or more side flanges can include one or more apertures, including as may be configured to engage a threaded rod or other similar support. For example, each of the first and second side flanges 116 includes an aperture 120. The aperture 120 is formed in an aperture tab that extends from an outer end of the side flange 116. Each aperture 120 of the first and second side flanges 116 are axially aligned and configured to receive a vertically oriented rod (see, e.g., rod 134 of FIG. 5) to mount the body plate 102 in the vertical orientation. Similarly aligned apertures of the third and fourth side flanges 118 (not numbered) allow the body plate 102 to be mounted with the same rod, or another similarly oriented rod, in a second vertical orientation that is rotated 90° from the vertical orientation described with respect to the first and second side flanges 116. In the illustrated embodiment, the aperture 120 is disposed proximate to a distal portion of the side flange 116. However, in some embodiments, an aperture may be disposed proximal to a medial portion of a side flange of a body plate.

As generally noted above, some embodiments can also include one or more mounting arms that allow a body plate to be mounted horizontally or otherwise differently than apertures on a side flange. For example, still referring to FIGS. 1-4, the body plate 102 includes a first mounting arm 126 and a second mounting arm 128 that extend from a mount surface 130. In some cases, the mount surface 130 can include a plurality of apertures that can align with knockouts of an electrical box, such as the electrical box 106, for example. Some of the apertures can have a perimeter formed by stamping and can thereby provide material to form the first and second mounting arms 126, 128 during a manufacturing process, although other approaches are also possible.

In some embodiments, one or more mounting arms can be oriented relative to a body plate so as to appropriately support the body plate in one or more orientations (e.g., horizontally) while also not interfering with support of the body plate in one or more other orientations (e.g., vertically). In this regard, for example, each of the first mounting arm 126 and the second mounting arm 128 can be collectively oriented at an oblique angle relative to the first and second side flanges 116. For example, in the illustrated embodiment, as shown in FIG. 3 in particular, the mounting arms 126, 128 extend from the body plate 102 substantially along one or more tangent planes that are oriented obliquely relative to the flanges 116, and are also bent relative to the body plate 102 along bend lines that are oriented obliquely relative to the flanges 116. Correspondingly, the first mounting arm 126 and the second mounting arm 128 are also collectively oriented at an oblique angle relative to the third and fourth side flanges 118. For example, each of the first mounting arm 126 and the second mounting arm 128 are oriented at approximately a 45° angle with respect to the first and second side flanges 116 (e.g., as measured relative to an outside plane defined by the flanges 116 or relative to a direction representing a shortest distance between the flanges 116). The oblique orientation of the mounting arms 126, 128 generally allows a support (e.g., a threaded rod) to pass through each of the aligned apertures 120 of the first and second side flanges 116 unobstructed by the mounting arms 126, 128, or to pass through each of the aligned apertures of the third and fourth side flanges 118, also unobstructed by the mounting arms 126, 128. In other embodiments, other orientations of mounting arms are possible, including other obliquely angled orientations, so that a rod can extend between apertures of first and second opposing side flanges.

Figure 5:
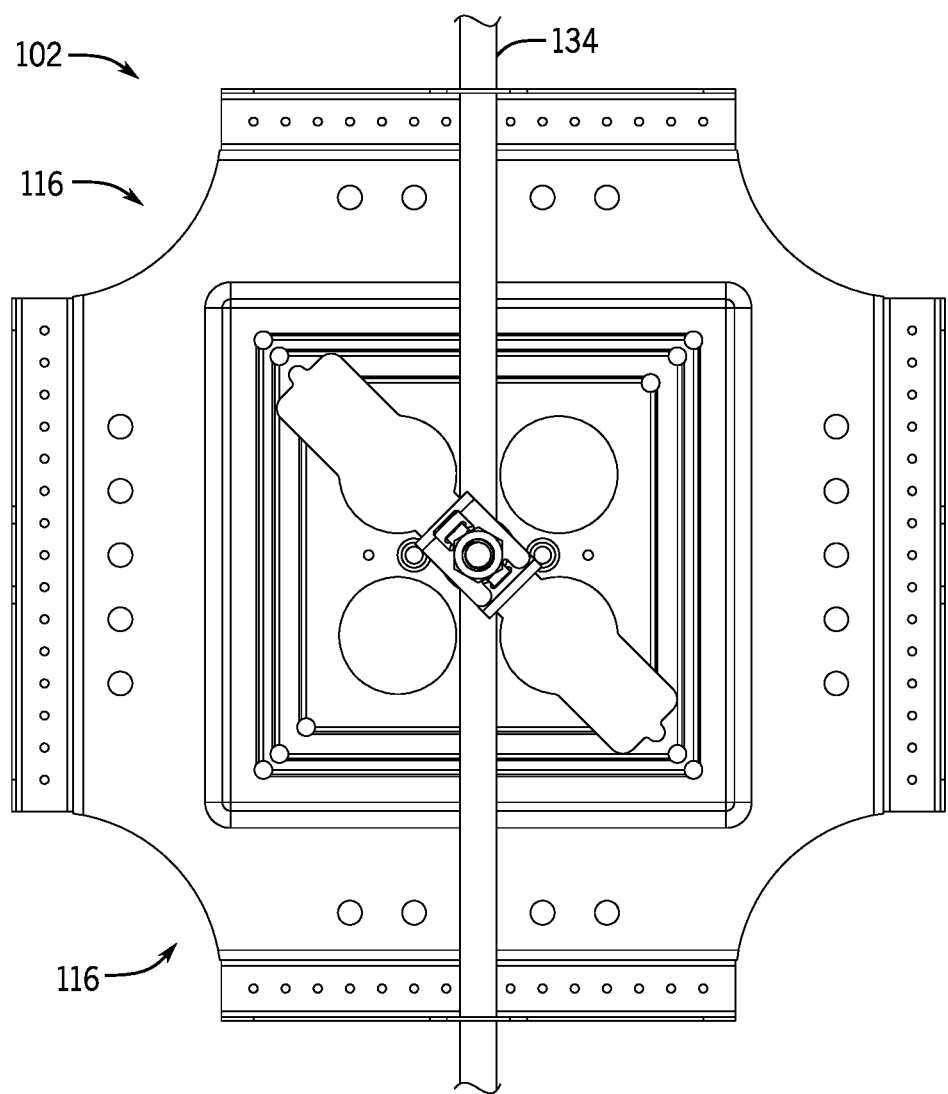
FIG. 5 is a rear elevation view of the body plate of FIG. 1 secured to a threaded rod in a vertical orientation.
Figure 6:
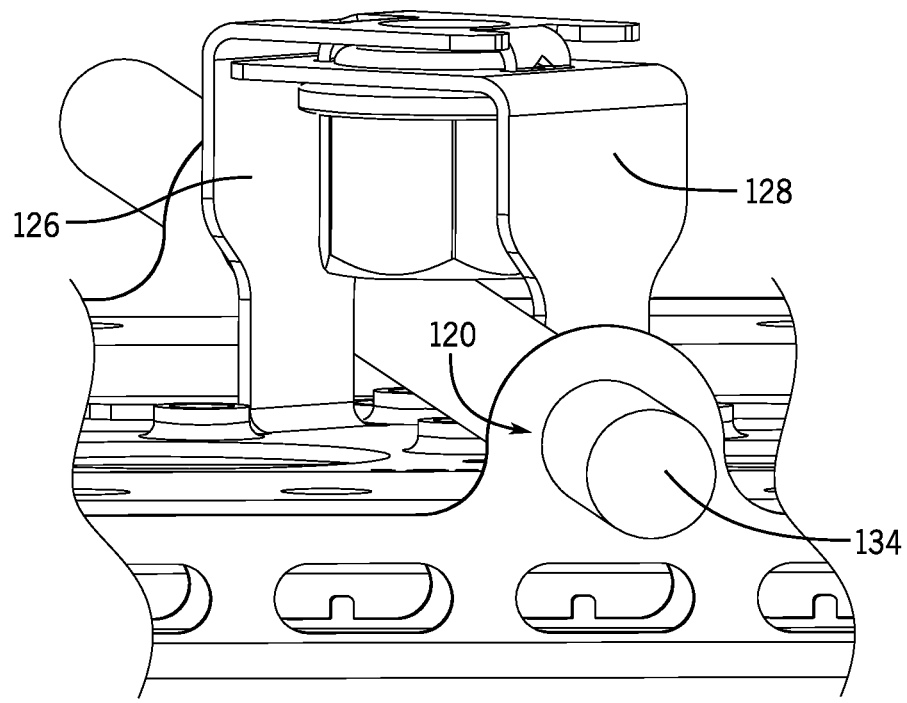
FIG. 6 is an isometric partial view of the body plate of FIG. 5.

Continuing, FIGS. 5 and 6 illustrate a threaded rod 134 extending through the apertures 120 of the first and second side flanges 116 (e.g., to support the body plate 102 in a vertical orientation). The threaded rod 134 also extends through a space between the first mounting arm 126 and the second mounting arm 128 near the mount surface 130, so that the threaded rod 134 can support the box support 100 in a vertical orientation. The body plate 102 can be secured to the threaded rod 134 in a vertical orientation via one or more nuts (see, for example, FIG. 1) or other fasteners, such as one or more pins, clamps, retaining clips, etc. Consistent with the discussion above, a similar configuration can also be used to support the box support 100 vertically, but rotated relative to the orientation shown in FIG. 5, via a threaded rod that extends through apertures in the flanges 118 (see, e.g., FIG. 4) and between the mounting arms 126, 128.

Figure 7:
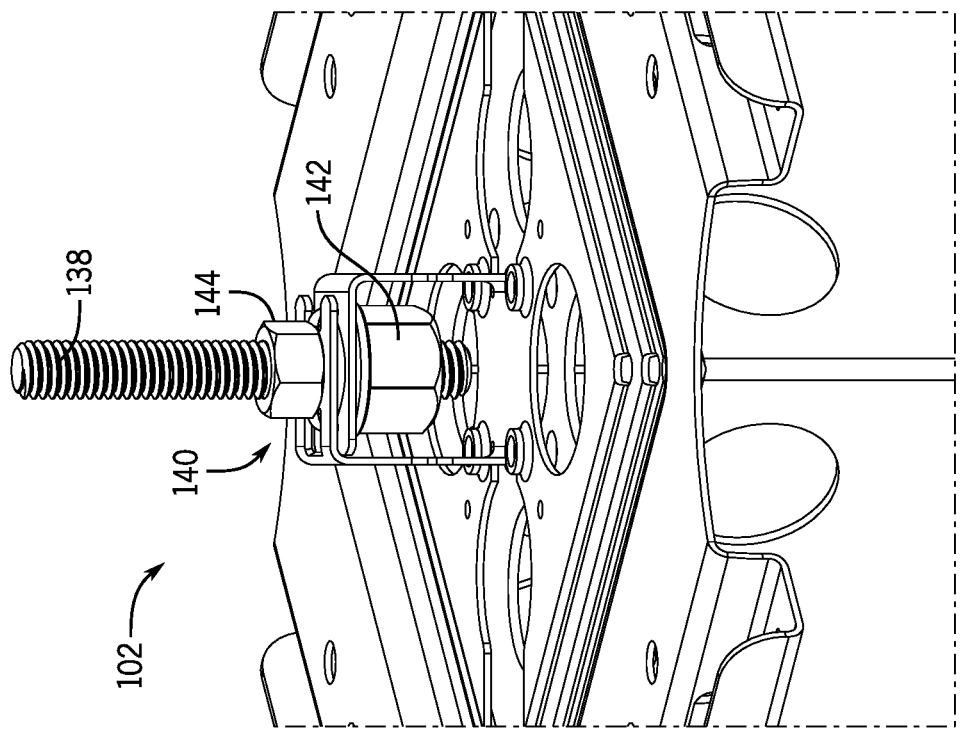
FIG. 7 is an isometric partial view of the body plate of FIG. 1 secured to a threaded rod in a horizontal orientation.

In some embodiments, a support can include a threaded fastener (e.g., a nut) secured to one or more mounting arms to engage a threaded rod. In this regard, for example, FIG. 7 illustrates a threaded rod 138 secured at the first mounting arm 126 and the second mounting arm 128 via a fastening assembly 140 so that the body plate 102 is secured in a horizontal orientation. In particular, the fastening assembly 140 includes a first nut 142 and a second nut 144, although other configurations are possible. Further, in the illustrated embodiment, the first nut 142 is configured as a rivet nut and the second nut 144 is configured as a jam nut (i.e., a push-on nut). In some embodiments, a fastening assembly can include a variety of push-on fasteners, such as any combination of nuts including rivet nuts, jam nuts, lock nuts, etc. In some embodiments, a fastening assembly may not necessarily include a push-on fastener (e.g., may include only standard twist-on/twist-off nuts).

Figure 8:
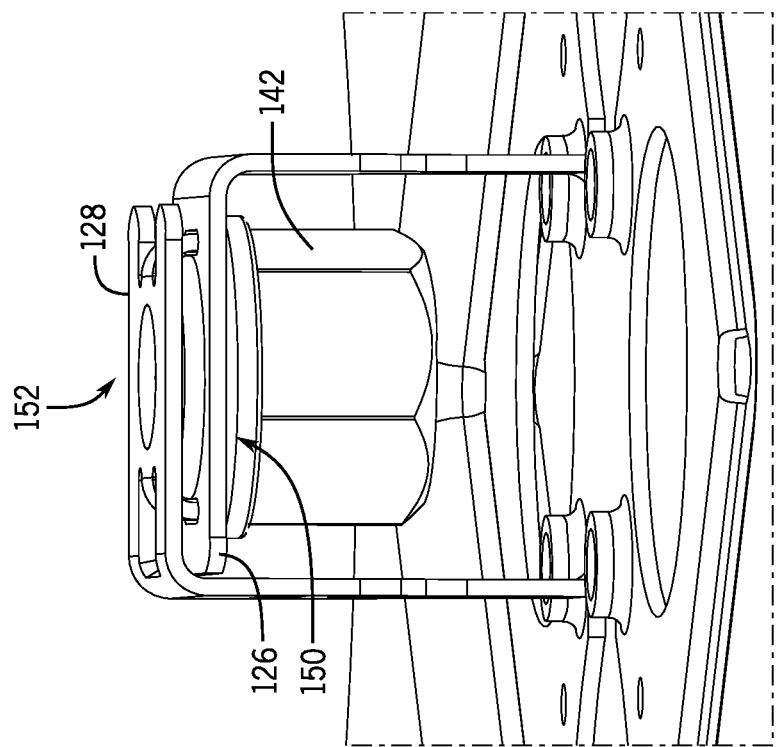
FIG. 8 is an isometric view of mounting arms of the body plate of FIG. 1 and a nut.

In different embodiments, a fastening assembly can be secured to one or more mounting arms in a variety of ways. Illustrated in FIG. 8, for example, the first nut 142 is supported by and secured to the first mounting arm 126 at a first bent portion 150. The second mounting arm 128 includes a second bent portion 152. The second bent portion 152 is opposite the first bent portion 150 with respect to the mount surface 130 of the body plate 102. In some embodiments, one or more mounting arms or other features can support an integrally formed threaded fastener, including by supporting an integrally formed threaded extrusion that is configured to receive a threaded rod.

Figure 9:
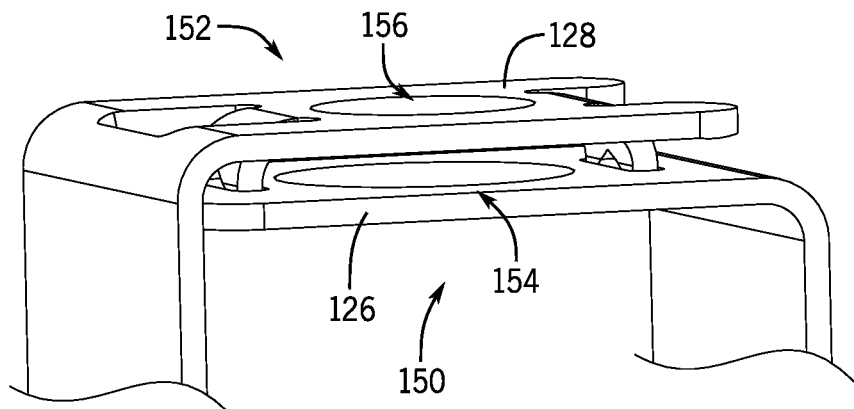
FIG. 9 is an isometric partial view of the mounting arms of FIG. 8.

Illustrated in FIG. 9, the first bent portion 150 of the first mounting arm 126 overlaps with the second bent portion 152 of the second mounting arm 128. The overlap between the first and second bent portions 150, 152 is spaced apart from the body plate 102 (e.g., at opposing ends of the mounting arms 126, 128 from the body plate 102, in the illustrated embodiment). The first mounting arm 126 includes a first aperture 154 formed in the first bent portion 150. The second mounting arm 128 includes a second aperture 156 formed in the second bent portion 152. Each of the first aperture 154 and the second aperture 156 are axially aligned and dimensioned to receive a rod or other mounting component, such as the threaded rod 138 shown in FIG. 7, for example. The first nut 142 (see, e.g., FIG. 8) is also dimensioned to receive the threaded rod 138. The threaded rod 138 can be inserted into the first nut 142 proximate the first aperture 154.

In some embodiments, a body plate, similar to the body plate 102, can include a threaded nut secured to at least one mounting arm opposite the body plate so that the mounting arm is disposed between the body plate and the threaded nut. In some embodiments, a body plate can include a single mounting arm that is stamped or otherwise formed from a single piece of material that may be integrally formed with the body plate or attached thereto. The single mounting arm can include one or more bent portions that provide an anchor point between the body plate and a threaded rod. The anchor point can provide a specific mounting orientation for the body plate, such as horizontal, for example.

Figure 10:
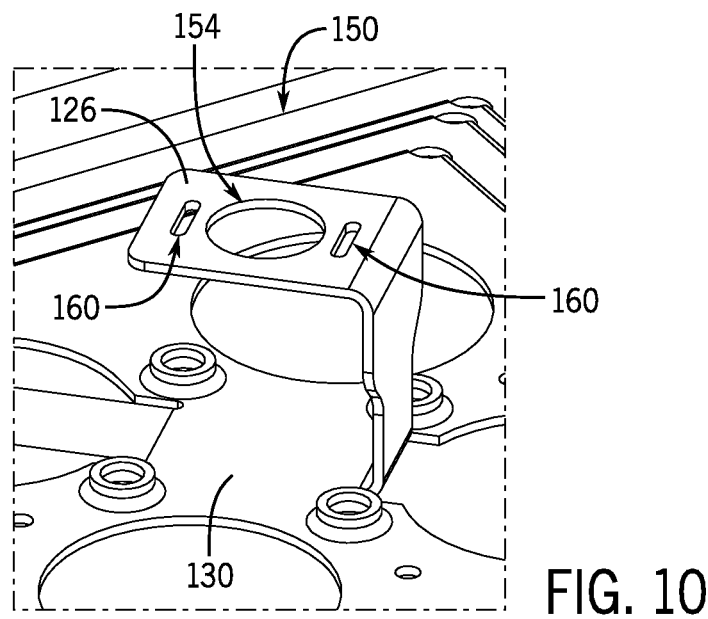
FIG. 10 is an isometric view of a first mounting arm of FIG. 9.

In some embodiments, features on mounting arms can help to selectively prevent fasteners of a fastening assembly from rotating, or otherwise lock engagement of a fastening assembly with a support structure (e.g., a threaded rod). For example, FIG. 10 illustrates the first mounting arm 126 according to some embodiments of the invention. In the illustrated embodiment, the first mounting arm 126 is integrally formed with the body plate 102. The first mounting arm 126 includes windows 160 disposed on opposite sides of the first aperture 154. The first aperture 154 and the windows 160 are formed in the first bent portion 150. The first bent portion 150 extends generally horizontal to the mount surface 130 of the body plate 102.

Figure 11:
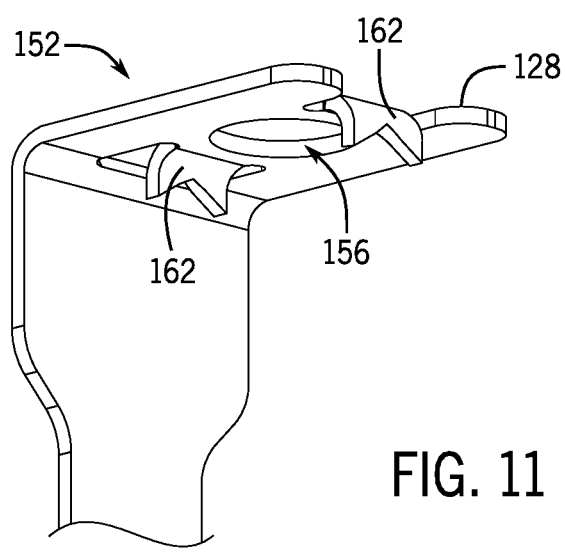
FIG. 11 is an isometric partial view of a second mounting arm of FIG. 9.

FIG. 11 illustrates the second mounting arm 128 according to some embodiments of the invention. In the illustrated embodiment, the second mounting arm 128 is integrally formed with the body plate 102. The second mounting arm 128 includes fingers 162 that are disposed on opposite sides of the second aperture 156. The second aperture 156 and the fingers 162 are formed in the second bent portion 152. The second bent portion 152 extends generally horizontal to the mount surface 130 of the body plate 102 and parallel to the first bent portion 150.

Figure 13:
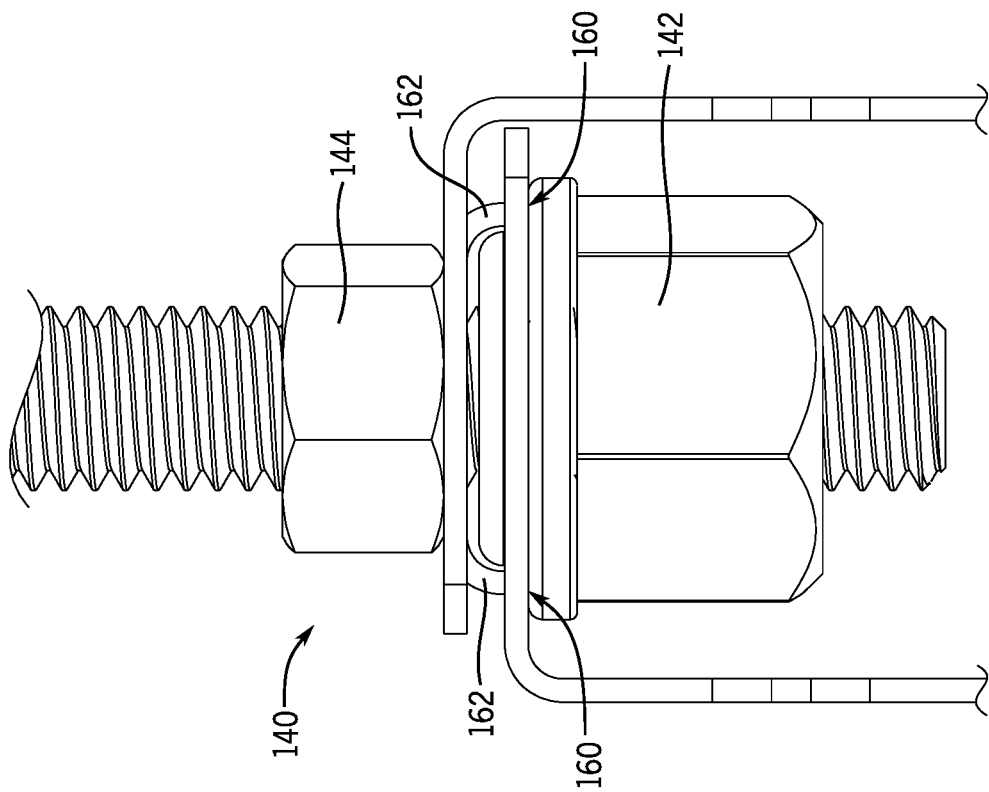
FIG. 13 is a side view of the mounting arms and the fastening assembly of FIG. 12 in a secured positioned.
Figure 12:
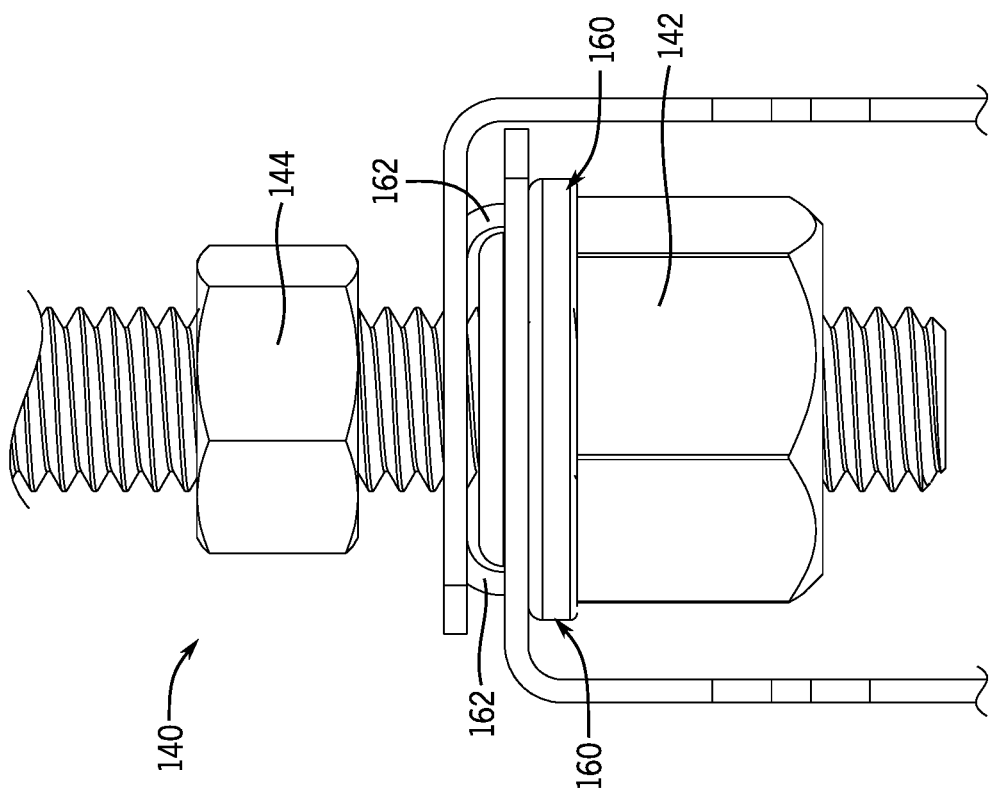
FIG. 12 is a side view of the mounting arms of FIG. 8 and a fastening assembly in an unsecured position.

As illustrated in FIGS. 12 and 13, the fingers 162 are dimensioned to at least partially extend through the windows 160. FIG. 12 illustrates the threaded rod 138 extending through each of the first and second apertures 154, 156 of the first and second mounting arms 126, 128, respectively, and through the first and second nuts 142, 144 of the fastening assembly 140. In FIG. 12, the fastening assembly 140 is generally in an un-tightened (or installation) orientation. As the fastening assembly 140 is tightened, the second nut 144 is urged toward the first nut 142, and eventually into contact (e.g., direct contact) with the second mounting arm 128.

FIG. 13 illustrates the second nut 144 in contact with the second bent portion 152 of the second mounting arm 128. FIG. 13 generally represents the fastening assembly 140 in a fully installed configuration after the second nut 144 is appropriately tightened relative to the first nut 142 with each of the first mounting arm 126 and the second mounting arm 128 secured between the first nut 142 and the second nut 144. In the installed configuration, the tightened second nut 144 urges the fingers 162 to extend through the windows 160 and engage (e.g., frictionally or piercingly grip) the first nut 142. When the fingers 162 appropriately engage the first nut 142, the first nut 142 is deterred from rotating and the combined engagement of the nuts 142, 144 with the threaded rod 138 and the mounting arms 126, 128 can lock the support 100 in a desired orientation.

Figure 14:
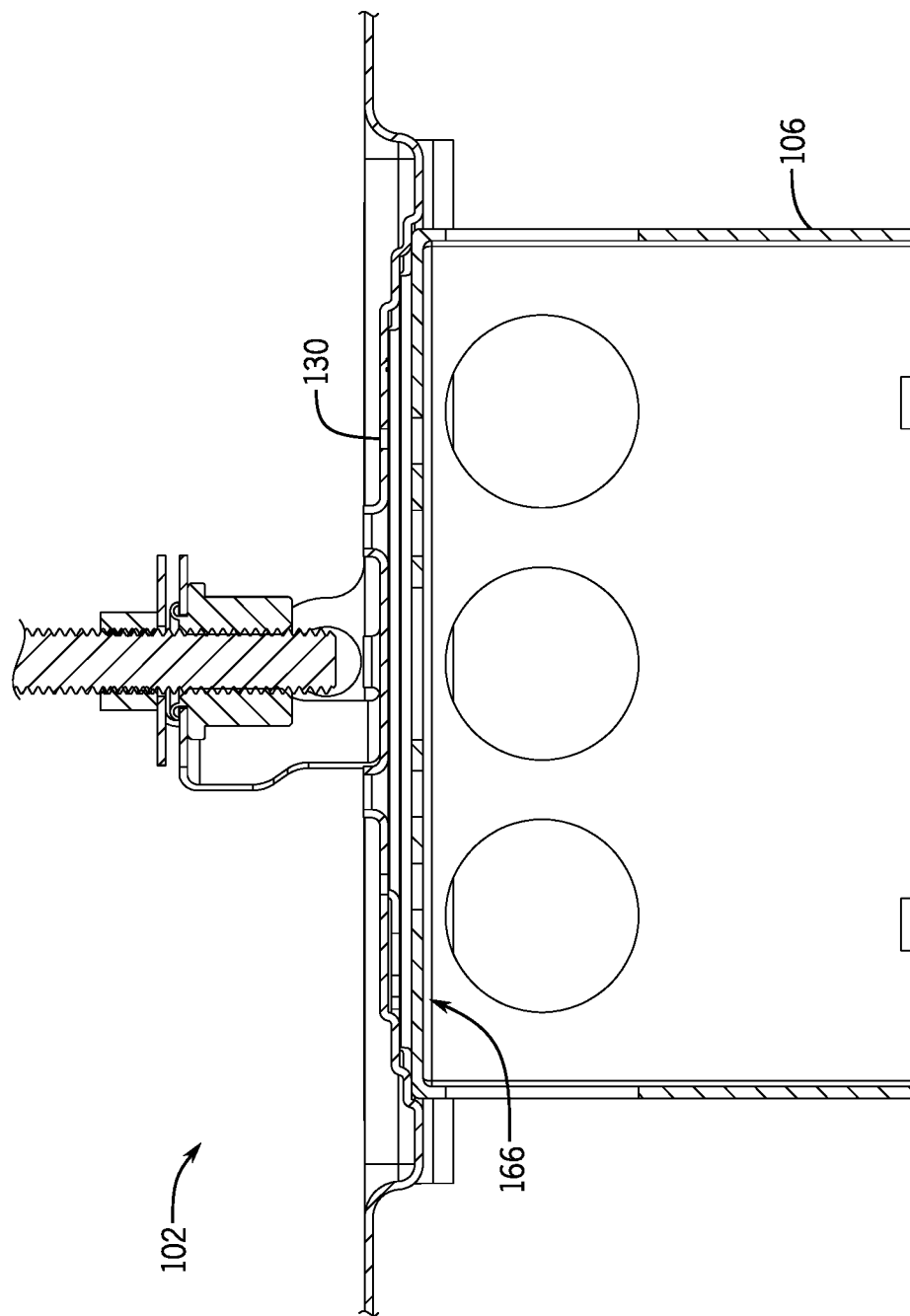
FIG. 14 is a cross-sectional side view of the body plate of FIG. 1 and an electrical box.

In some embodiments, a support can include a plurality of mounting features, which can help to align and secure electrical boxes of various sizes or shapes. In this regard, for example, FIG. 14 illustrates a cross section of the body plate 102 and the electrical box 106 that shows a plurality of mounting features on the body plate 102. For example, proximate to the mount surface 130, the body plate 102 includes a nested array of recessed profiles 166. Each profile 166 can be configured to receive an electrical box of a particular size. In particular, an outer perimeter of the recessed profile 166 can be dimensioned to engage an electrical box so that the electrical box is seated within the recessed profile 166, such as the electrical box 106 is seated in the recessed profile 166 proximate to the mount surface 130. In some embodiments, mounting features of the body plate 102 can include extruded holes, embossed profiles, fasteners, such as clips, for example, and additional attachment arms. In some embodiments, a recessed profile may generally only align an electrical box, and extruded holes or other features can be used, along with appropriate fasteners, to secure the box in place.

Generally, the nested array of recessed profiles 166 allows the body plate 102 to receive a plurality of sizes of electrical boxes with appropriate (e.g., centered) alignment. In the illustrated embodiment, the recessed profiles 166 are generally concentric square recessed profiles. In some embodiments, a body plate can include mounting features that facilitate mounting of a variety of electrical boxes having a variety of shapes such as rectangular, round, hexagonal, and other regular or irregular geometries. In some embodiments, a body plate can include mounting features such as protrusions, bosses, recesses, apertures, etc. that secure or partially secure an electrical box to the body plate.

Figure 15:
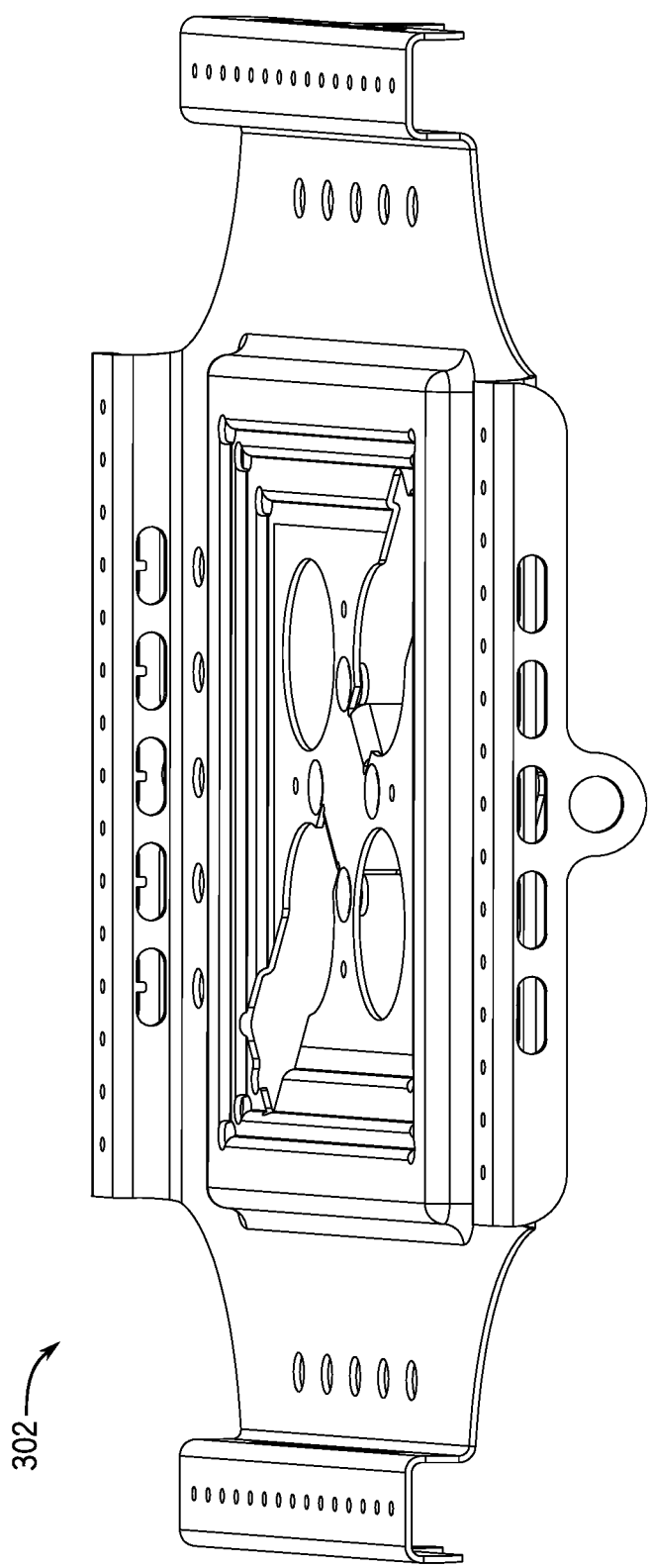
FIG. 15 is an isometric view of a body plate according to an embodiment of the invention.
Figure 16:
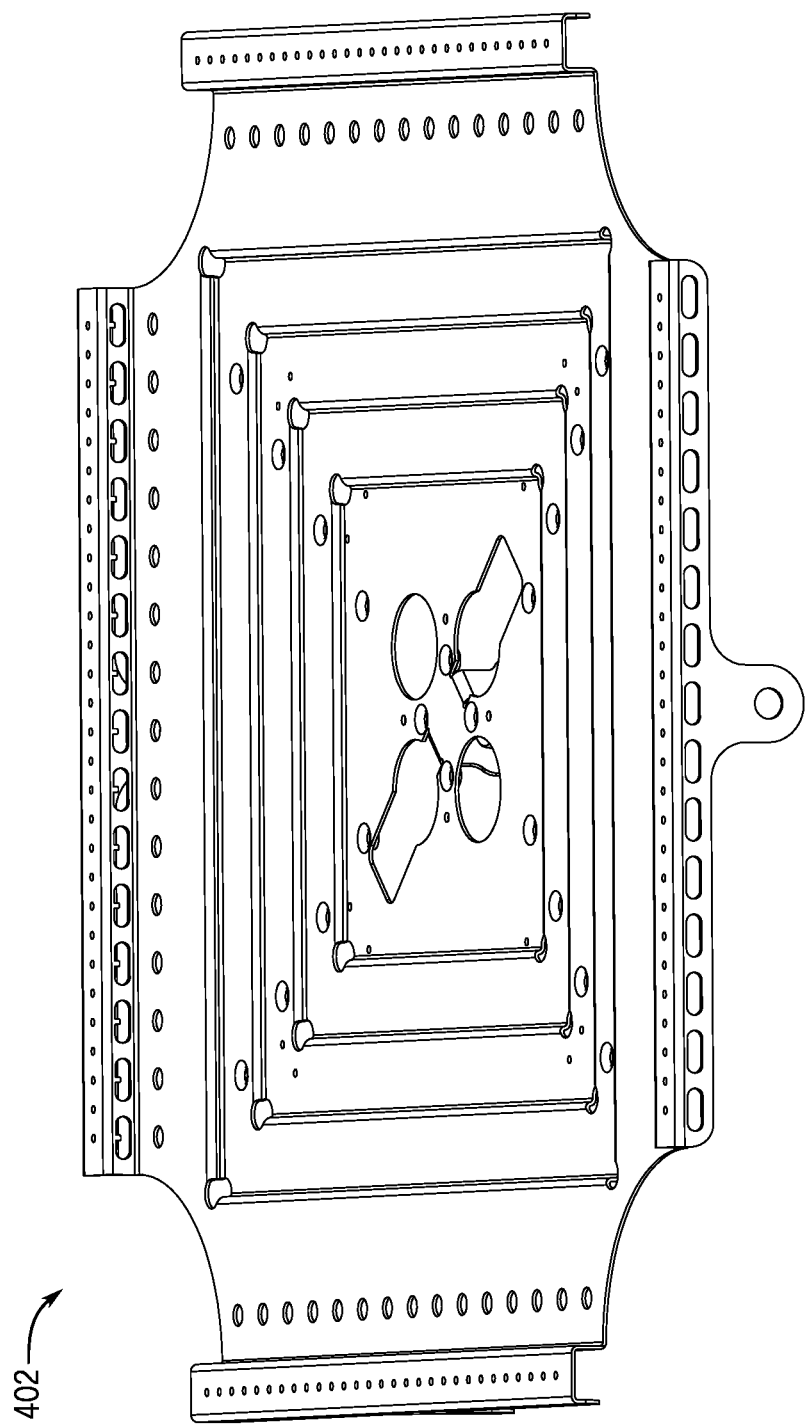
FIG. 16 is an isometric view of a body plate according to an embodiment of the invention.

Although a particular example configuration is discussed above relative to the support 100, a variety of other configurations, including similar supports having different sizes, are also possible. For example, FIGS. 15 and 16 illustrate body plates 302 and 402, respectively, according to some embodiments of the invention. Each of the body plates 302, 402 include similar corresponding features to the body plate 102. As a result, the details and features described above and below in reference to the body plate 102 can generally be applied to each of the body plates 302 and 402. Generally, however, each of the body plates 302, 402 provide a variation of the geometry of the body plate 102. For example, the body plates 302, 402 may be able to accommodate other electrical box geometries (e.g., other box sizes).

Figure 17:
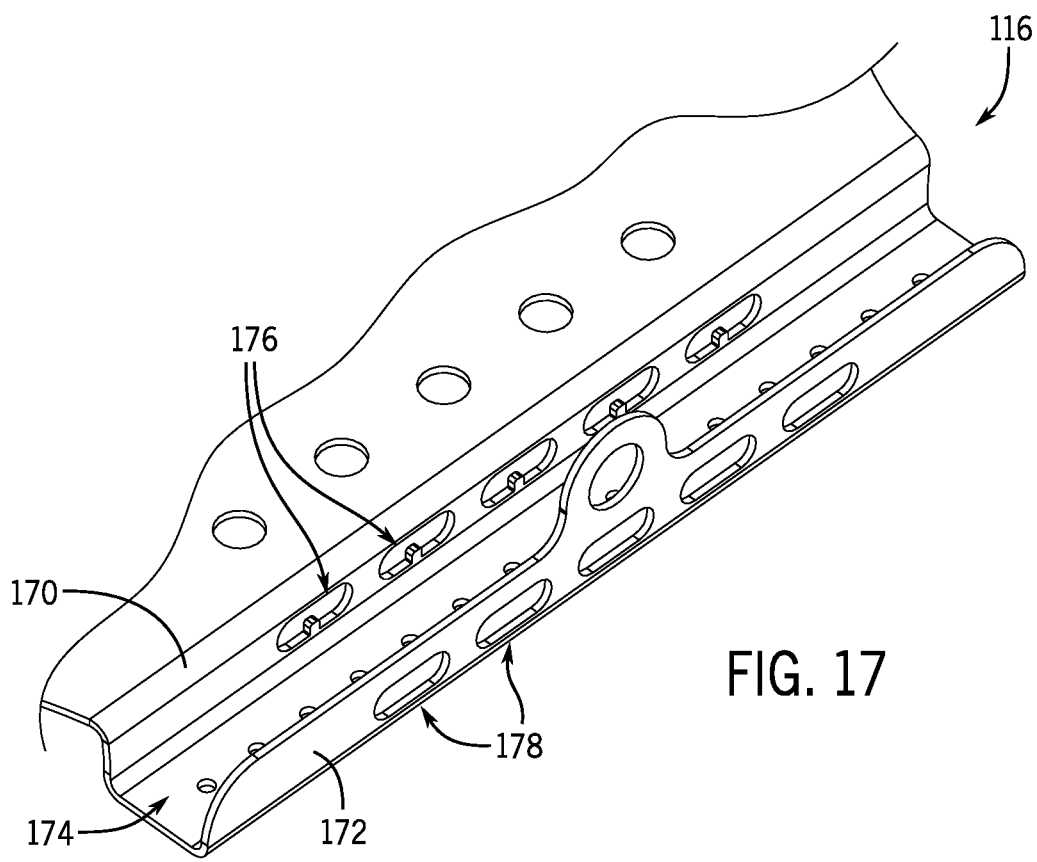
FIG. 17 is an isometric partial view of a side flange of the body plate of FIG. 1.

As also generally noted above, some embodiments can include features to allow easy engagement with one or more clamps or other external components. In this regard, for example, FIG. 17 illustrates a single side flange 116 of the body plate 102 according to some embodiments of the invention. As described above, the side flange 116 can have similar or corresponding features to the third and fourth side flanges 118 of the body plate 102, or any of the side flanges of the body plates 302, 402, so discussion of the side flange 116 below can also apply to these other side flanges. In particular, the side flange 116 includes a first wall 170 and a second wall 172 that define a channel 174. The first wall 170 includes a first plurality of slots 176 and the second wall 172 includes a second plurality of slots 178. The first plurality of slots 176 are aligned with the second plurality of slots 178 (e.g., each of the slots 176 is coaxial with a corresponding one of the slots 178 along a common insertion direction). As also discussed below, each set of aligned slots 176, 178 can receive a slide portion of a clamp (or other external component) to secure the clamp (or other component) to the side flange 116.

Figure 18:
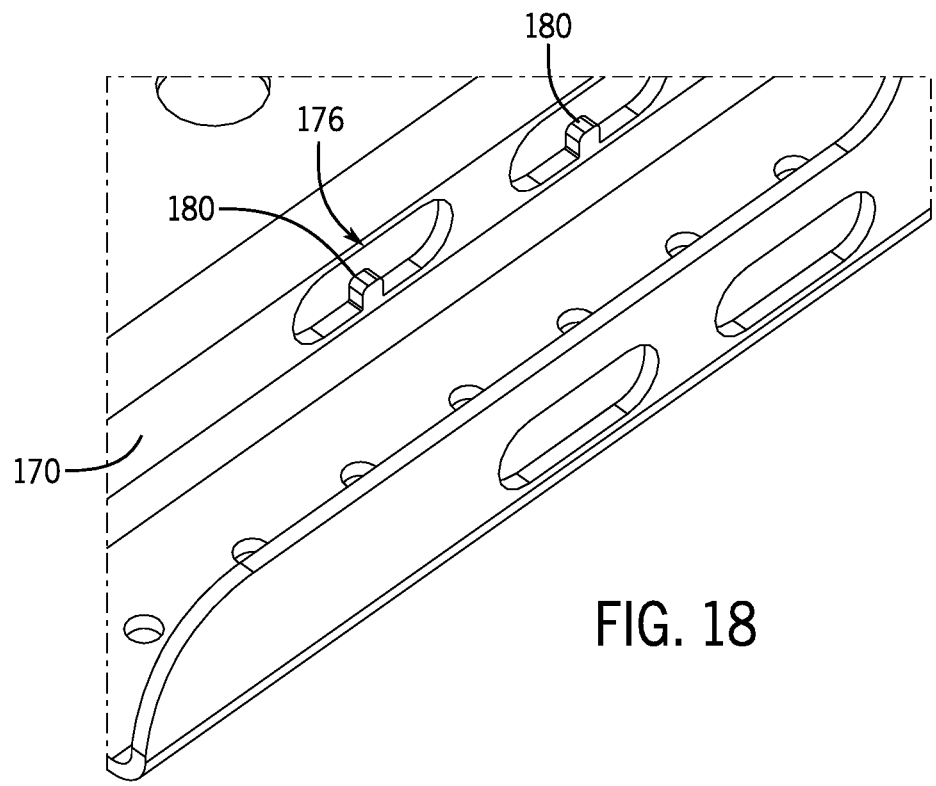
FIG. 18 is an isometric partial view of a body channel of the side flange of FIG. 17.

In some embodiments, a slot can include one or more features that help to further secure a component that is received therein. For example, FIG. 18 illustrates a plurality of tabs 180 that are integrally formed with the first wall 170 and extend into the first plurality of slots 176. In some embodiments, a body plate can include internal tabs within a first plurality of slots and/or within a second plurality of slots formed on walls of a channel. In some embodiments, the tabs can extend generally in an upward direction from a wall of the channels. However, in other embodiments, the tabs can extend generally in a downward direction from the wall of the channels. In some embodiments, other securing features can be provided, in one or more sets of slots or elsewhere.

Figure 19:
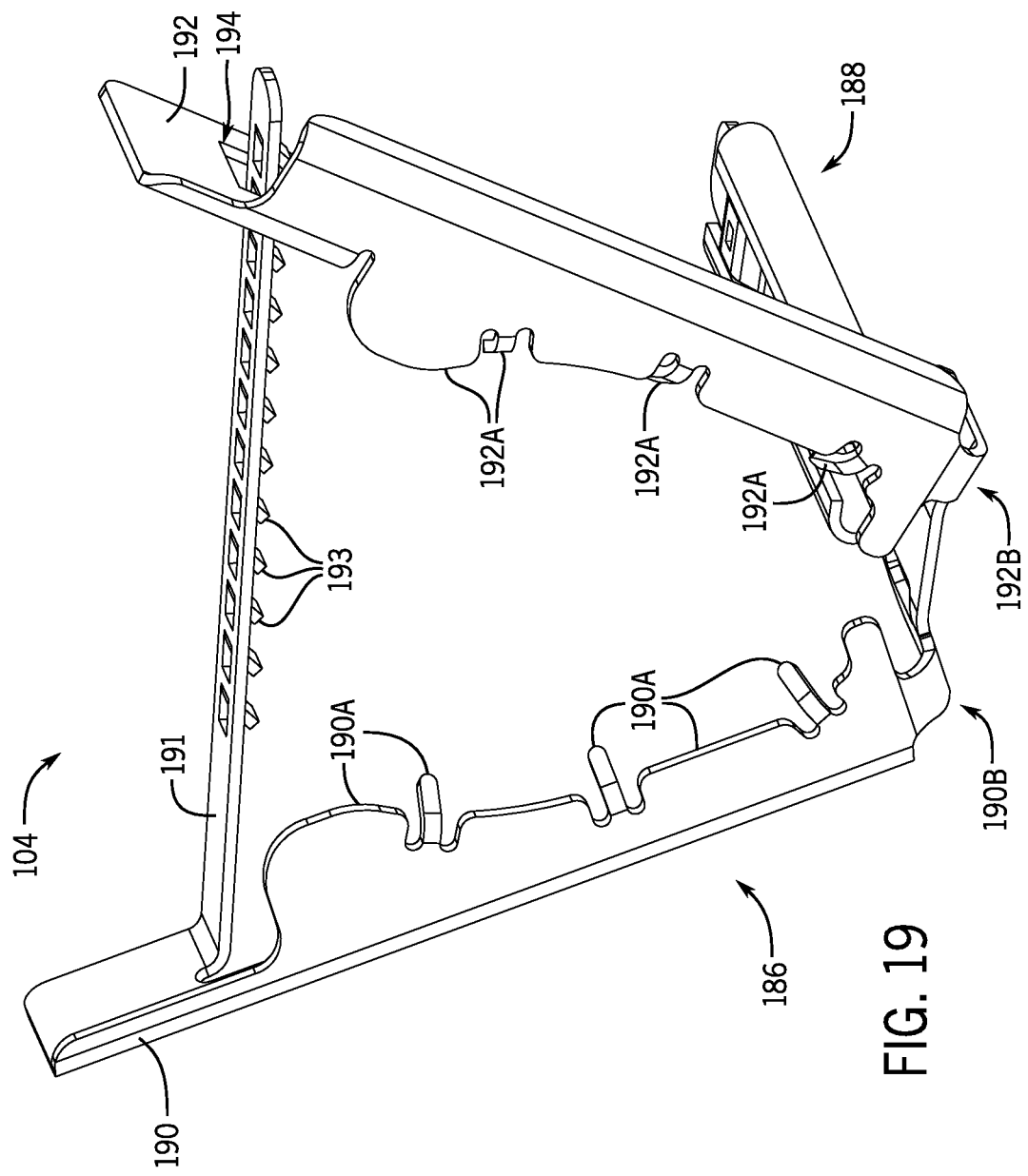
FIG. 19 is an isometric view of the clamp of FIG. 1.
Figure 20:
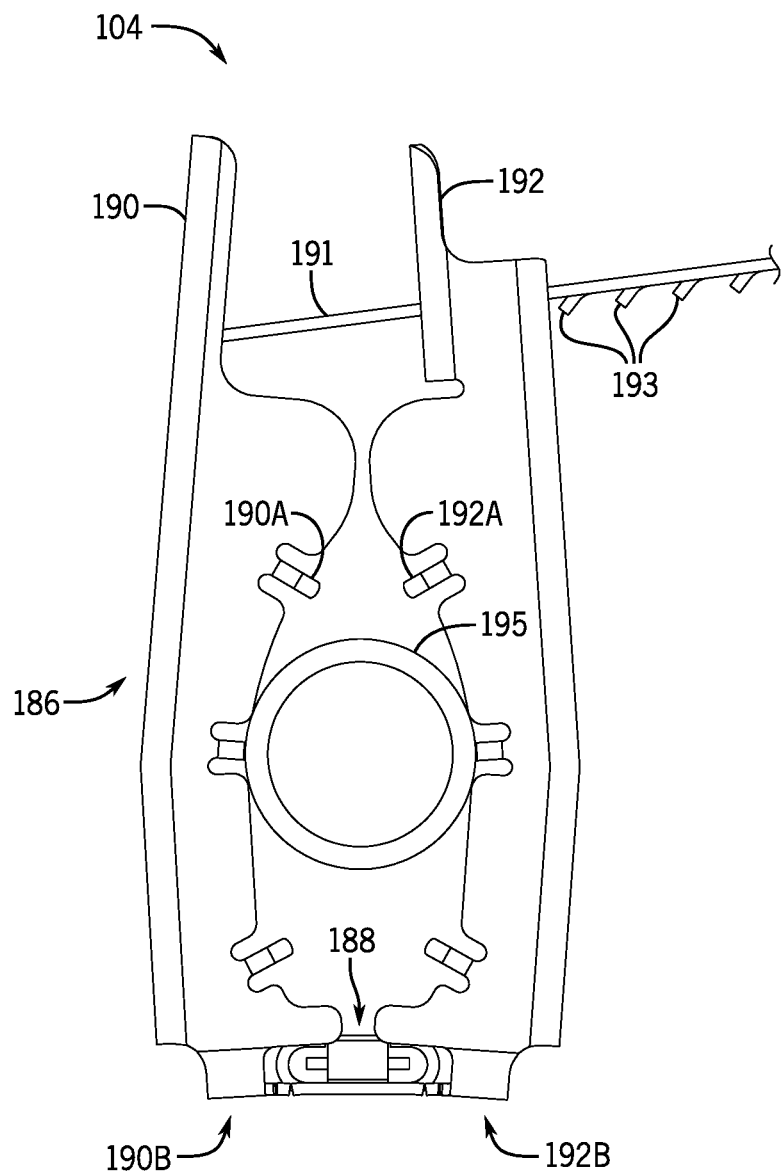
FIG. 20 is a front view of the clamp of FIG. 19 clamped around a conduit.

FIGS. 19 and 20 illustrate the clamp 104 according to some embodiments of the invention, which can be secured at the side flange 116 (or otherwise). The clamp 104 includes a clamp portion 186 and a slide portion 188. The clamp portion 186 includes a first clamp arm 190 and a second clamp arm 192 that are generally moveable relative to each other and the slide portion 188. The slide portion 188 is dimensioned to be at least partially received by the first plurality of slots 176 and the second plurality of slots 178. In some embodiments, a different feature (e.g., a different clamp portion or a non-clamping structure) can be used in combination with a slide portion (e.g., similar to the slide portion 188).

As shown in FIGS. 19 and 20, the first clamp arm 190 includes a strap 191 that extends laterally from the clamp arm 190. In some embodiments, the strap 191 can be integrally formed with the clamp portion 186 and bent relative to the clamp arm 190. Additionally, as shown in FIGS. 19 and 20, the strap 191 can include a plurality of teeth 193 that extend from at least one side of the strap 191. One or more teeth of the plurality of teeth 193 are configured to engage the second clamp arm 192 at an opening 194 formed in the second clamp arm 192. In general, the strap 191, in combination with the plurality of teeth 193 and the opening 194, provide the clamp 104 with a ratcheting mechanism. The ratcheting mechanism can allow the clamp 104 to engage and secure a variety of elongated elements, including pipes, rods, conduits, etc. having a variety of diameters or outer profiles.

The clamp portion 186 can engage a variety of elongated elements between the first clamp arm 190 and the second clamp arm 192 so that one or more of first clamp arm engaging members 190A and one or more of second arm engaging members 192A contact one or more elongated elements to be secured by the clamp 104. The first and second clamp arm engaging members 190A, 192A, which can be configured as a toothed profile, can include one or more of bent tabs and contoured edges configured to grip a wide range of pipes, conduits, cables, etc. In the illustrated embodiment, the bent tabs of the clamp arm engaging members 190A, 192A bend laterally away from the respective clamp arms 190, 192 and toward the slide portion 188 of the clamp 104. However, in other embodiments, the bent portions can bend in other directions, such as away from the slide portion 188. In some embodiments, the clamp 104 can be manufactured from a single piece of material (e.g., stamped) and formed to include the bent tabs of the engaging members 190A, 192A and the slide portion 188.

The slide portion 188 can extend from each of the clamp arms 190, 192 at a respective flex portion 190B, 192B. The flex portions 190B, 192B can allow the clamp arms 190, 192 to flex toward each other to facilitate gripping a conduit (or the like) between each of the clamp arms 190, 192. For example, illustrated in FIG. 20, the clamp 104 can secure a conduit 195 via the ratcheting mechanism so that the strap 191 extends through the opening 194 in the second clamp arm 192 and one of the plurality of teeth 193, which are generally angled back toward the first clamp arm 190, engage the second clamp arm 192 at a perimeter of the opening 194. Each of the first and second clamp arms 190, 192 can bend (e.g., curve) around the conduit 195 to reinforce the grip of the engaging members 190A, 192A on the conduit 195.

Figure 28:
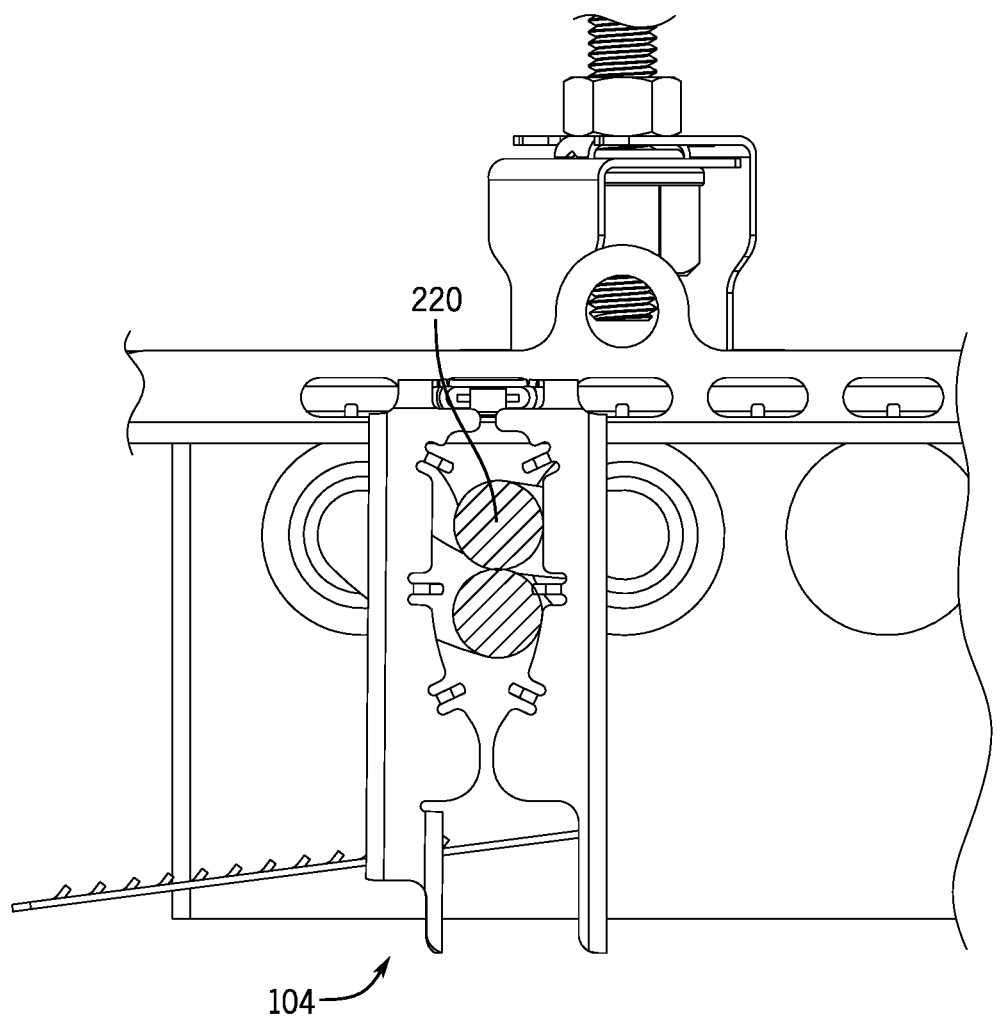
FIG. 28 is a side view of the support of FIG. 1 including cables disposed between the clamp arms of the clamp of FIG. 19.

As described above, the clamp 104 can be configured to secure a variety of elongated elements, including conduits having narrower or wider diameters than the conduit 195 (see, for example, FIGS. 1, 2, and 26), and in some embodiments, a plurality of elongated elements, such as cables (see, for example, FIG. 28). Additionally, the flex portions 190B, 192B can facilitate the ratcheting of the clamp 104 so that the clamp arms 190, 192 can be secured relative to each other at a variety of distances that correspond to one of the plurality of teeth 193 engaging the second clamp arm 192. In this regard, a pipe, conduit, or other elongated elements can be secured between the clamp arms 190, 192 at a number of positions along the length of the arms 190, 192. For example, the conduit 195 of FIG. 20 can be secured between the arms 190, 192 at a location closer to the strap 191 so that the distal ends of the arms 190, 192 would be positioned farther apart and less teeth 193 of the strap 191 are extended through the opening 194 of the second clamp arm 192.

Figure 21A:
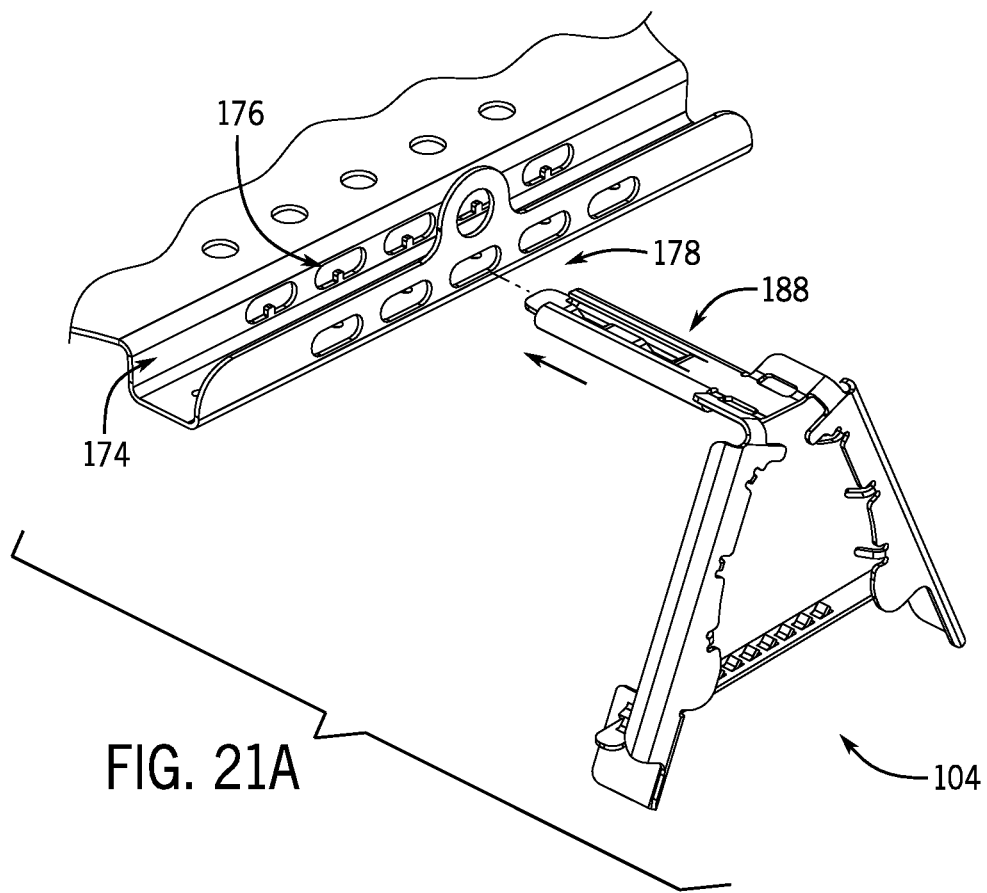
FIG. 21A is an isometric view of the clamp of FIG. 19 prior to engagement with the body plate of FIG. 1.
Figure 21B:
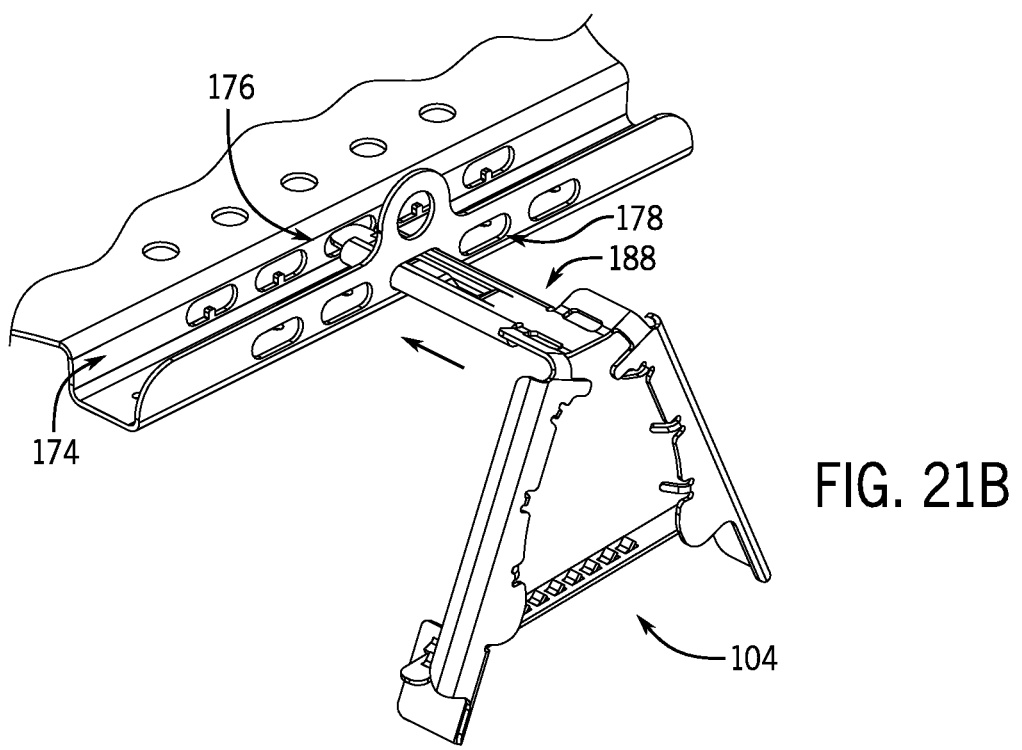
FIG. 21B is an isometric view of the clamp of FIG. 19 during installation with the body plate of FIG. 1.

To secure the clamp 104 to the support 100, the slide portion 188 of the clamp 104 can be slid into any one of the second plurality of slots 178 in the direction shown in FIGS. 21A and 21B. The slide portion 188 can then be further inserted into the channel 174 of the side flange 116 via the second plurality of slots 178 and into an aligned one of the first plurality of slots 176 to selectively secure the clamp 104 to the body plate 102. In some embodiments, including as further discussed below, the clamp 104 can be manually slid into engagement with the slots 176, 178 in a single motion.

Figure 22:
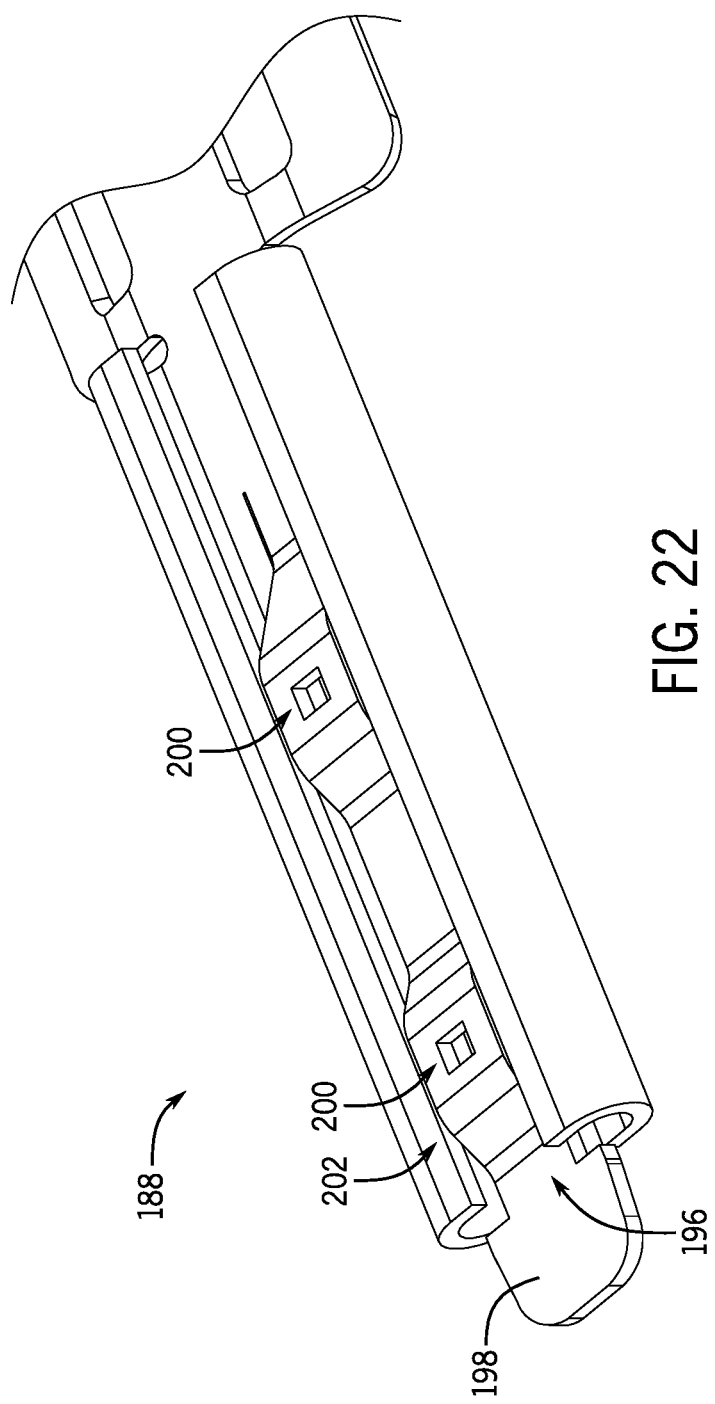
FIG. 22 is an isometric view of a slide portion of the clamp of FIG. 19.

In some embodiments, a slide portion can include a locking arm (e.g., a cantilevered, biased locking arm) that can help to lock the slide portion at particular insertion depth relative to one or more slots. For example, FIG. 22 illustrates the slide portion 188 according to some embodiments of the invention. The slide portion 188 includes a slide channel 196 and a locking arm 198 within the slide channel 196 (e.g., as integrally formed from a bottom wall of the slide channel 196). The slide channel 196 is sized to be slidably received in any of the first and second plurality of slots 176, 178. The locking arm 198 includes an opening 200 that is dimensioned to receive the tab 180 of the side flange 116. The opening 200 is disposed on a ramped portion 202 of the locking arm 198. In the illustrated embodiment, the opening 200 is formed in a flat peak of the locking arm 198 and two ramped surfaces extend on opposing sides of the flat peak. Additionally, in the illustrated embodiment, the locking arm 198 includes two ramped portions 202 and two openings 200. However, in other embodiments, more or fewer ramped portions and openings are possible, as are other ramp configurations (e.g., curved rather than linear ramps), other sizes, shapes, and orientations of openings, and so on.

Figure 23D:
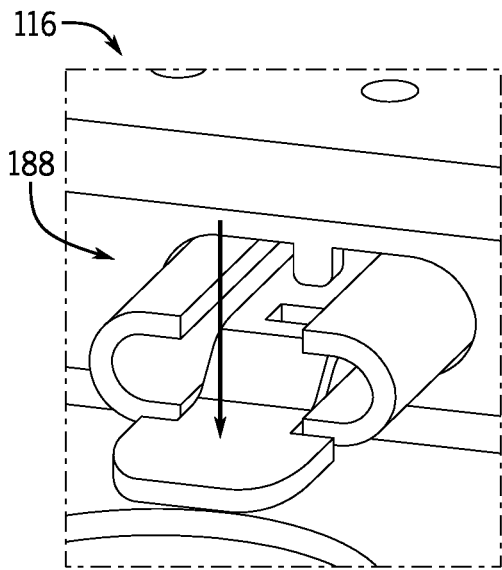

FIGS. 23A-G illustrate the engagement of the slide portion 188 of the clamp 104 with the side flange 116 of the body plate 102 according to some embodiments of the invention. When the slide portion 188 is inserted into a slot of the first plurality of slots 176, a portion of the slide portion 188 extends and slides freely through the slot 176, as illustrated in FIG. 23A. As the slide portion 188 of the clamp 104 is moved further into the slot 176 (i.e., the direction indicated in FIGS. 21A and 21B), the tab 180 moves along a first side of the ramped portion 202, which deflects the locking arm 198 downward within the slide channel 196, as illustrated in FIG. 23B. With further insertion of the slide portion 188, the tab 180 continues up the first side of the ramped portion 202 and can then engage the locking arm 198 at the opening 200 at the top of the ramped portion 202, as illustrated in FIG. 23C. In general, FIG. 23C corresponds to the clamp portion 186 of the clamp 104 secured at a first distance from the side flange 116, which can be achieved for the illustrated embodiment with a single manual insertion movement.

The locking arm 198 is cantilevered relative to the slide channel 196 and biased toward engagement with the tab 180. When the tab 180 is received by the opening 200, the clamp 104 is secured to the body plate 102 and unable to slide relative to the side flange 116 without being manually released. However, the locking arm 198 can be manually moved against the biasing force to selectively slide the clamp 104 relative to the body plate 102. When the locking arm 198 is manually pressed in the direction shown in FIG. 23D, the tab 180 is disengaged from the opening 200 and the clamp 104 can be slid further into or out of the slot 176.

Figure 23E:
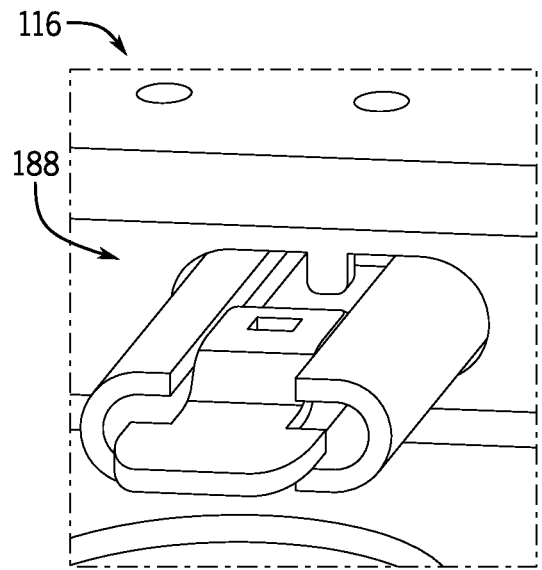
Figure 23F:
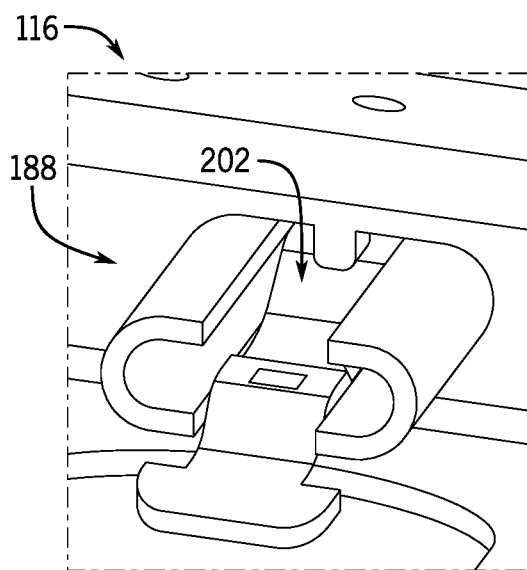
Figure 23G:
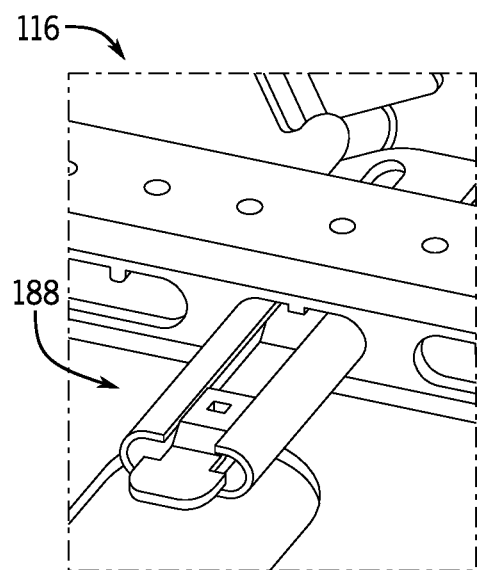

Once the tab 180 is disengaged from the opening 200 and the slide portion 188 is further inserted into the slot 176, the locking arm 198 can be released from manual actuation and the tab 180 can move along a second side of the ramped portion 202 (or the first side if a user is pulling the clamp 104 away from the body plate 102), as illustrated in FIG. 23E. FIGS. 23F and 23G illustrate the tab 180 moving along the first side of a second ramped portion 202 to engage an opening 200 of the second ramped portion 202 (in a similar process as discussed above, relative to the first ramped portion 202). When the tab 180 is engaged in the second ramped portion 202 that is positioned closer to the clamp portion 186 along the locking arm 198, the clamp portion 186 of the clamp 104 is secured at a second distance from the side flange 116. In the illustrated embodiment, the first distance is greater than the second distance, although other configurations are also possible.

Figure 24:
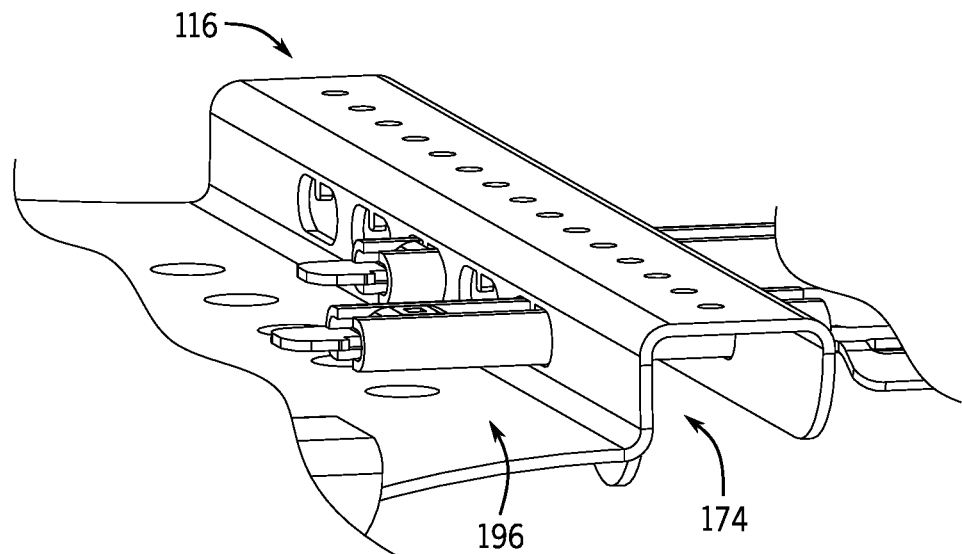
FIG. 24 is an isometric partial view of the body plate of FIG. 1 including a plurality of clamps.
Figure 25:
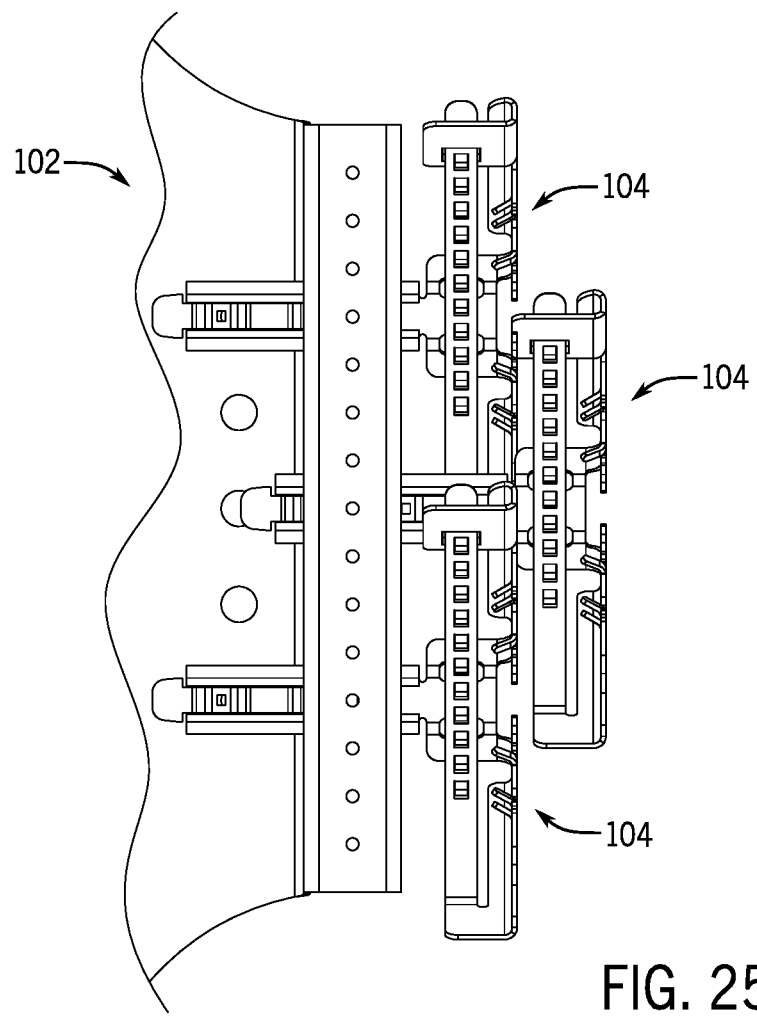
FIG. 25 is a top isometric view of the body plate of FIG. 1 including a plurality of clamps.

In some embodiments, the ability to secure clamps (or other external components) at different insertion distances can allow for a staggered installation that can optimize space usage, including for sets of identical (e.g., same-length) clamps. FIGS. 24 and 25 illustrate an example embodiment of how multiple clamps 104 can be oriented and secured to the body plate 102. In particular, FIG. 24 shows two slide channels 196 extending perpendicularly through the channel 174 of the slide flange 116 by different insertion distances so that one clamp portion 186 is positioned closer to the body plate than the other. FIG. 25 illustrates an example of a corresponding staggered configuration of clamps 104 relative to the body plate 102. In general, for the illustrated example, the distance between the openings 200 formed in the locking arm 198 dictate distances that the clamp portion 186 can be secured to the body plate 102, so that different distances between the openings 200 (or inclusion of additional openings) can allow for different staggered installation configurations. While FIG. 25 illustrates three clamps 104 secured to the body plate 102, other configurations of clamps 104 are possible. For example, more or fewer clamps can be secured to a body plate at varying or equal distances.

Figure 26:
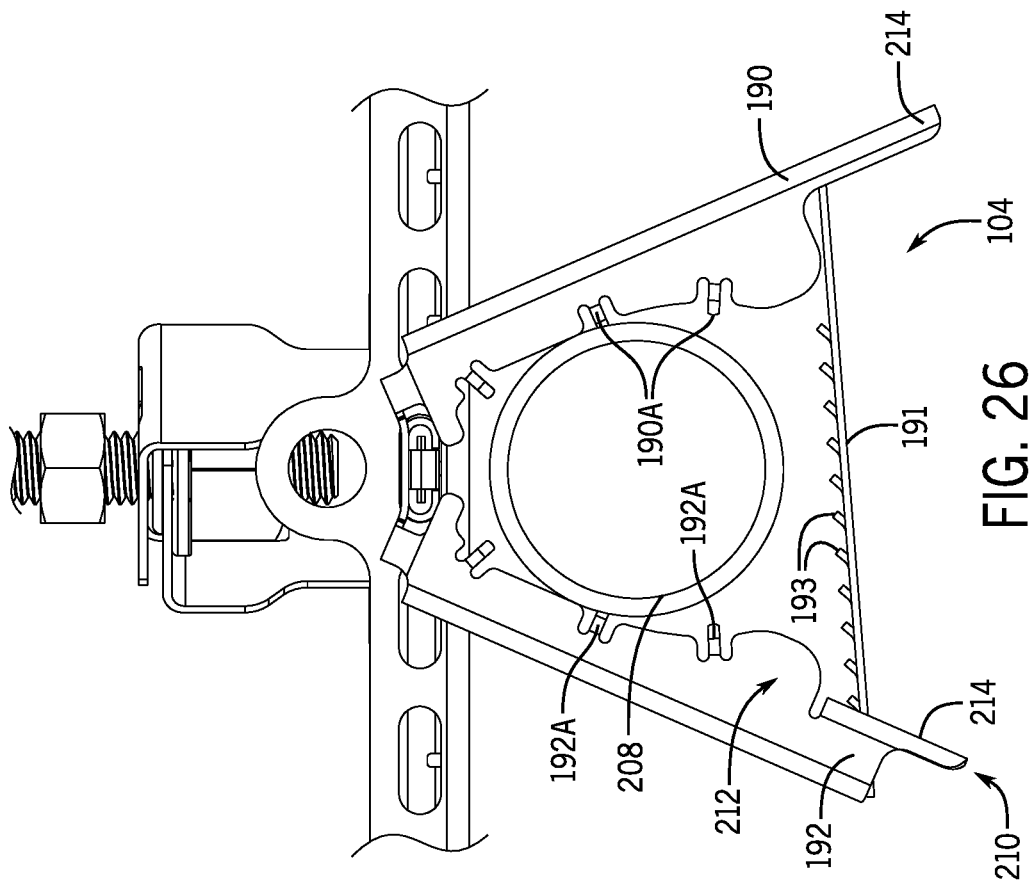
FIG. 26 is a side view of the support of FIG. 1 including a conduit disposed between clamp arms of the clamp.

In different embodiments, as also noted above, different clamps or other components can be configured for use with a box (or other) support, including through inclusion of a slide portion (e.g., as discussed above relative to the slide portions 188). Further in this regard, FIG. 26 illustrates the clamp 104 engaging a conduit 208 according to one embodiment of the invention. Each of the first clamp arm 190 and the second clamp arm 192 include a free end 210 and a toothed profile 212. The toothed profile 212 is configured to engage and secure electrical components that extend between the first and second clamp arms 190, 192, such as conduits and cables, for example. In the illustrated example, the toothed profiles 212 include interleaved sets of relatively wide and successively more protuberant tabs and relatively thin fingers that angle out of the plane of the adjacent tabs. However, other configurations are possible.

In some embodiments, a clamp can include one or more features to assist in manual engagement of the clamp with conduits or cables. For example, each free end 210 includes a clamp tab 214 that is integrally formed with the respective first and second clamp arms 190, 192. The clamp tabs 214 are configured to be manually engaged to close the clamp portion 186.

Figure 27:
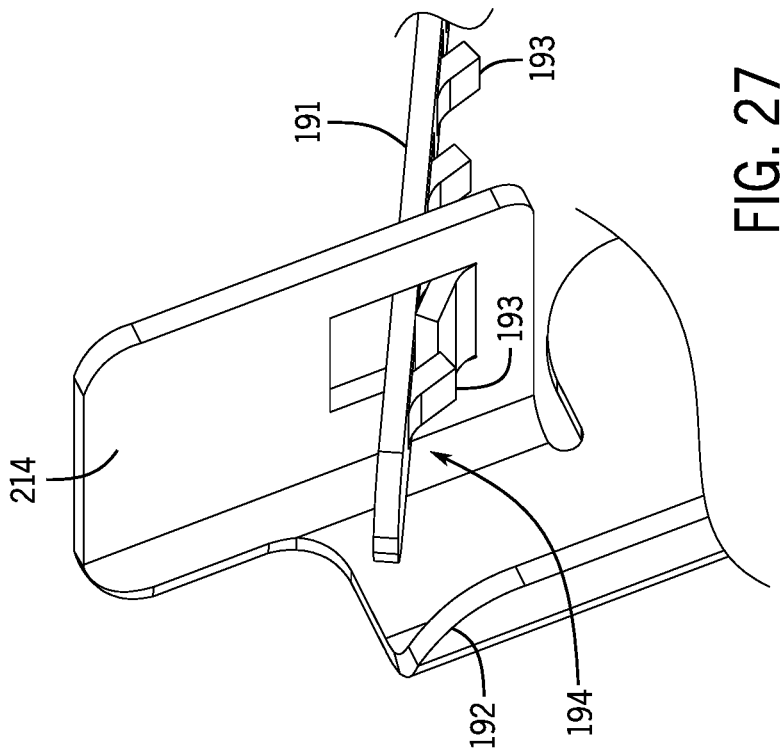
FIG. 27 is an isometric partial view of a toothed strap and strap opening of the clamp of FIG. 19.

Continuing in this regard, the first clamp arm 190 includes the toothed strap 191 extending from one clamp tab 214. The second clamp arm 192 includes the corresponding opening 194 (e.g., a strap recess) formed in the other clamp tab 214, illustrated in FIG. 27. As a user manually closes the clamp portion 186 via the clamp tabs 214, the strap 191 is moved through the opening 194 and secured via the engagement of one of the teeth 193 of the strap 191 with the perimeter of the opening 194. In some embodiments, the clamp portion 186 may be released if the engaged tooth 193 of the strap 191 is released from the opening 194. In some embodiments, similar features can be formed separately from clamp tabs (e.g., on other parts of respective clamp arms).

FIG. 28 illustrates the clamp 104 in a clamped position according to some embodiments of the invention. In FIG. 28, the clamp 104 engages cables 220 via the toothed profile 212 of the first and second clamp arms 190, 192. In the illustrated clamped position, the strap 191 is extended through the opening 194 and the clamp tabs 214 are in close proximity relative to the position of the clamp tabs 214 when the clamp portion 186 is in an unclamped position, illustrated in FIG. 19, for example.

In the embodiment illustrated in FIG. 28, the cables 220 extend centrally through the clamp portion 186 and the first and second clamp arms 190, 192 are generally parallel. However, in some embodiments, cables or conduits may extend off-centered through a clamp portion of a clamp, such as clamp 104, and arms of the clamp may deflect simultaneously or singularly with respect to a slide portion of the clamp. In general, first and second clamp arms 190, 192 of the clamp 104 are flexible relative to the slide portion 188 via a two-point connection to the slide portion 188 (see, e.g., FIGS. 21A and 21B).

Figure 29:
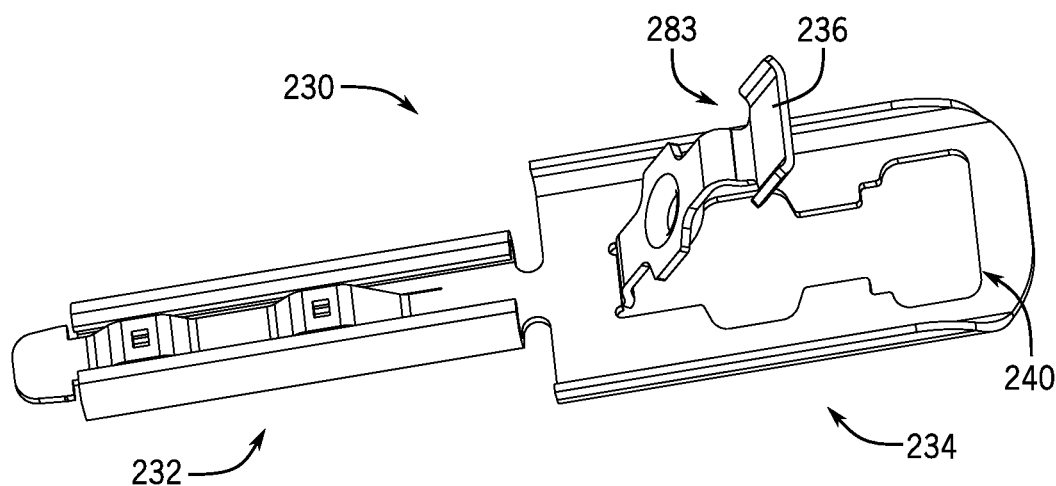
FIG. 29 is a top isometric view of a clamp according to an embodiment of the invention.
Figure 30:
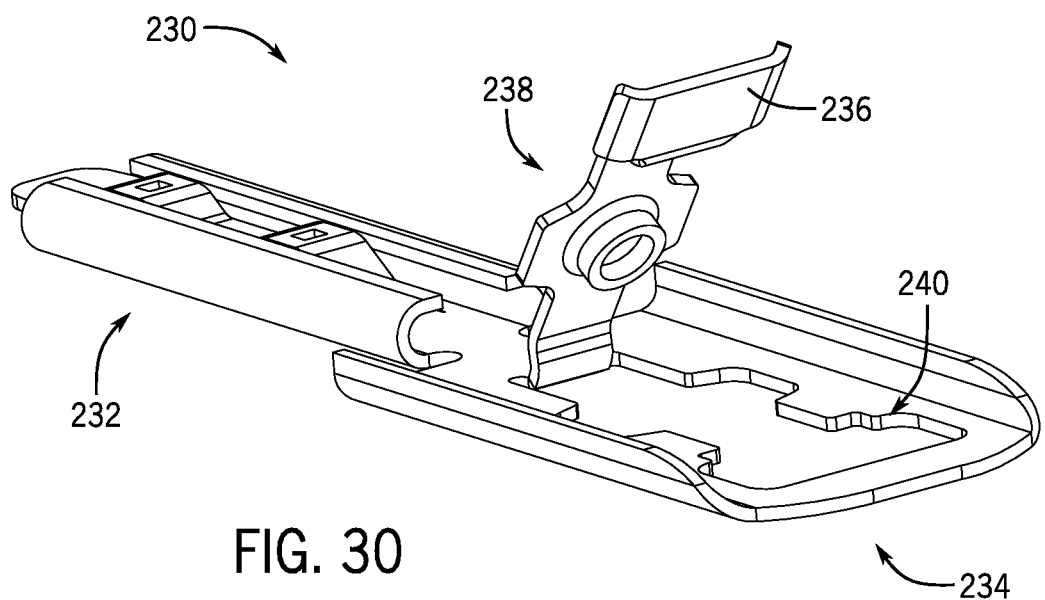
FIG. 30 is a front isometric view of the clamp of FIG. 29.

As noted above, some embodiments can include other structures in combination with slide portions, for sliding engagement with a support. For example, FIGS. 29 and 30 illustrate another clamp 230 according to some embodiments of the invention. The clamp 230 includes a slide portion 232 that is substantially similar to the slide portion 188. The clamp 230 also includes a clamp portion 234. The clamp portion 234 includes a clamp tab 236 that is integrally formed with the clamp portion 234. The clamp tab 236 includes a stepped profile 238 at a lateral end of the clamp tab 236. The clamp portion 234 correspondingly includes a recess 240 having a matching stepped profile. The stepped profile 238 of the clamp tab 236 is configured to snap into engagement with an edge of the recess 240 in the clamp portion 234. In general, the clamp 230 is configured to secure a variety of fastening devices, such as a conduit clamp, for example.

Figure 31:
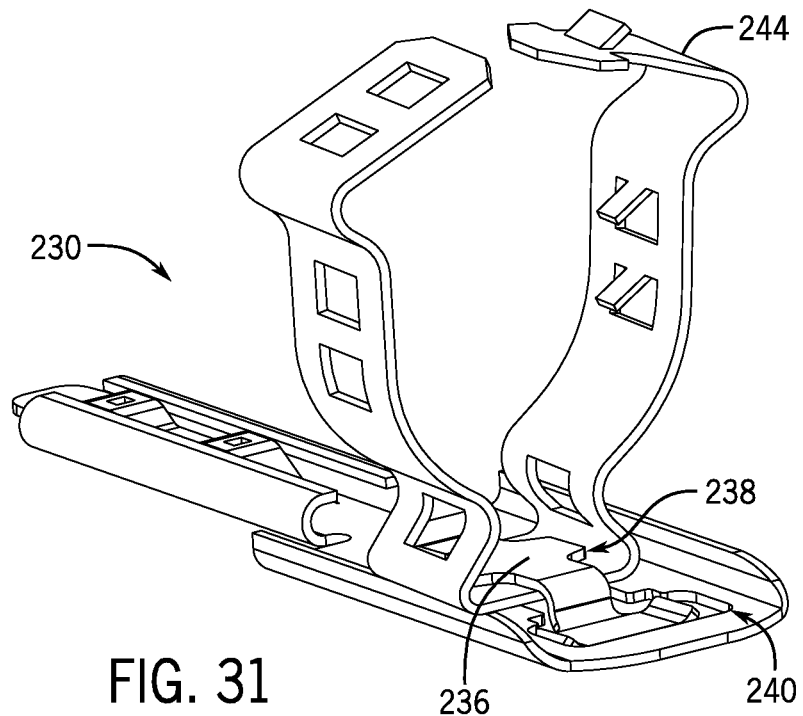
FIG. 31 is an isometric view of a conduit clamp secured to the clamp of FIG. 29, according to an embodiment of the invention.

In particular, FIG. 31 illustrates a conduit clamp 244 secured to the clamp 230 according to some embodiments of the invention. The conduit clamp 244 is secured to the clamp 230 at the clamp portion 234 via the clamp tab 236. In particular, the clamp tab 236 is bent around the conduit clamp 244, with an extrusion on the clamp tab 236 engaging a bolt hole (not shown) on the conduit clamp 244. The bent portion of the clamp tab 236 shortens the effective length of the clamp tab 236 so that the stepped profile 238 of the clamp tab 236 is positioned closer to the slide portion 232 and the stepped profile 238 can be snapped into a narrowed portion of the recess 240.

Figure 32:
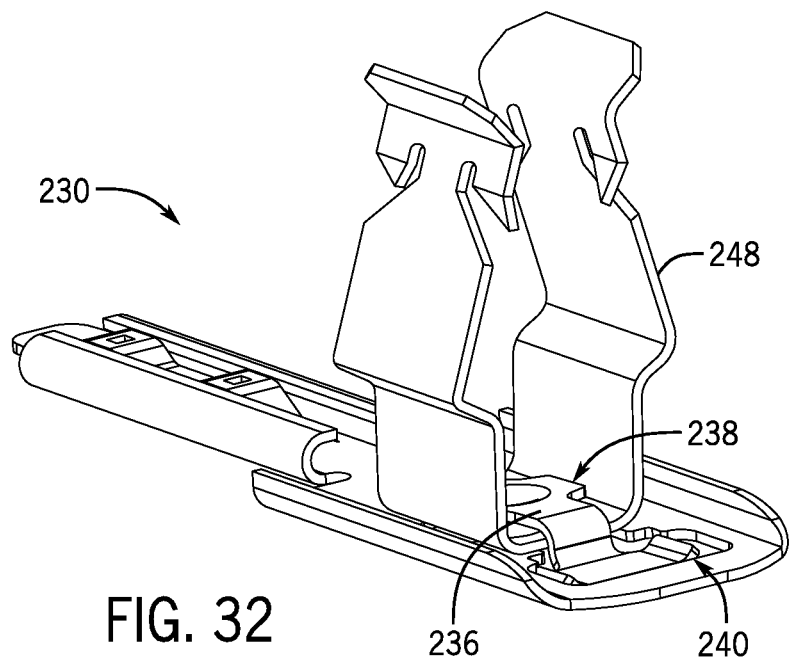
FIG. 32 is an isometric view of another conduit clamp secured to the clamp of FIG. 29, according to an embodiment of the invention.

FIG. 32 illustrates another conduit clamp 248 according to some embodiments of the invention. Similar to the conduit clamp 244, the conduit clamp 248 is secured to the clamp 230 at the clamp portion 234 via the clamp tab 236.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A support system for an electrical box, the support system comprising:
   a body plate that includes a mount surface to support an electrical box in a horizontal orientation or in a vertical orientation, a first side flange, and one or more sets of slots formed in the first side flange; and
   a clamp that includes:
      a slide portion slidably receivable, selectively, in any set of the one or more set of slots;
      a clamp portion supported by the slide portion to engage conduits or cables of different sizes, the clamp portion including a strap on a first clamp arm and a strap opening on a second clamp arm;
      the strap extending through the strap opening as the first and second clamp arms are closed onto one or more conduits or cables, to provide a toothed engagement with the second clamp arm at any of a plurality of locations along the strap, to secure the first and second clamp arms in a closed configuration relative to one or more conduits or cables.

2. The support system of claim 1, wherein the first side flange includes a first side wall and a second side wall that define a channel therebetween, one or more first slots of the one or more sets of slots being formed in the first side wall and one or more second slots of the one or more sets of slots being formed in the second side wall.

3. The support system of claim 1, wherein the clamp portion includes a first clamp arm and a second clamp arm and each of the first and second clamp arms includes one or more of:
   a toothed profile to engage one or more conduits or cables; or
   a free end with a clamp tab that is manually engageable to close the clamp portion around one or more conduits or cables.

4. The support system of claim 1, wherein the strap is integrally formed with the clamp portion and bent relative to the second clamp arm to secure the first and second clamp arms in the closed configuration.

5. A support system for an electrical box, the support system comprising: a body plate that includes a mount surface to support an electrical box in a horizontal orientation or in a vertical orientation, a first side flange, and one or more sets of slots formed in the first side flange; and a clamp that includes: a slide portion slidably receivable, selectively, in any set of the one or more set of slots; and
   a clamp portion supported by the slide portion to engage conduits or cables of different sizes the slide portion including a slide channel slidably receivable, selectively, in any set of the one or more set of slots, and a locking arm that is cantilevered within the slide channel.

6. The support system of claim 5, wherein the locking arm includes a plurality of openings arranged to receive a tab of the body plate to secure the clamp to the first side flange, with the clamp portion supported at any of a corresponding plurality of distances from the first side flange.

7. The support system of claim 6, wherein the tab extends into a slot of the one or more sets of slots.

8. The support system of claim 6, wherein each opening of the plurality of openings of the locking arm is disposed on a respective ramped portion of the locking arm.

9. The support system of claim 1, wherein the first side flange includes a first aperture that receives a support rod to support the body plate in the vertical orientation; and
   wherein the body plate further includes first and second central mounting arms that receives a support rod to support the body plate in the horizontal orientation.

10. A support system for an electrical box, the support system comprising:
   a body plate to support an electrical box; and
   a first side flange extending on a first side of the body plate and a second side flange extending on a second side of the body plate opposite the first side, one or more of the first side flange or the second side flange including:
      a first side wall and a second side wall that define a channel therebetween;
      a first plurality of openings formed in the first side wall; and
      a second plurality of openings formed in the second wall;
      the second plurality of openings being aligned with the first plurality of openings to form sets of aligned openings of the first and second pluralities of openings to selectively receive a slide portion of an attachment.

11. The support system of claim 10, further comprising:
the attachment, further including a clamp portion supported by the slide portion, the clamp portion including a first clamp arm and a second clamp arm movable to engage conduits or cables of different sizes.

12. The support system of claim 11, wherein one or more of the first clamp arm or the second clamp arm includes a toothed profile to engage one or more conduits or cables.

13. The support system of claim 11, wherein the one or more of the side flanges includes a tab; and
wherein the slide portion of the attachment includes a locking arm that has openings arranged to receive the tab, to secure the clamp to the body plate with the clamp portion at any of a plurality of distances from the body plate.

14. The support system of claim 13, wherein the tab is one of a plurality of tabs, each tab of the plurality of tabs extending integrally formed from the first side wall into a respective opening of the first plurality of openings.

15. The support system of claim 13, wherein, with the slide portion engaged with a set of aligned openings, the locking arm is biased toward the tab.

16. The support system of claim 11, wherein the support system further comprises:
a toothed strap on the first clamp arm; and
a strap opening on the second clamp arm; and
wherein the toothed strap is arranged to extend through the strap opening as the first and second clamp arms are closed onto one or more conduits or cables, and to provide a toothed engagement with the second clamp arm, at any of a plurality of locations along the toothed strap, to secure the first and second clamp arms in a closed configuration relative to one or more conduits or cables.

17. A method of supporting conduits or cables extending from an electrical box supported by a body plate, the method comprising:
supporting the electrical box on a mount surface of the body plate in a horizontal orientation or in a vertical orientation, with one or more conduits or cables extending from the electrical box;
aligning a clamp portion of a clamp the one or more conduits or cables, the clamp portion supported by a slide portion of the clamp; and
slidably inserting the slide portion into a set of aligned openings in a first side flange of the body plate to secure the clamp to the body plate; and
engaging the clamp portion with the one or more conduits or cables to secure the one or more conduits or cables relative to the body plate.

18. The method of claim 17, wherein the set of aligned openings are formed by a first slot formed in a first wall of the first side flange and a second slot aligned with the first slot and formed in a second wall of the first side flange, the first opening being one of a plurality of first openings in the first wall and the second opening being one of a plurality of second openings in the second wall aligned in sets with the plurality of first openings.

19. The method of claim 18, wherein inserting the slide portion of the clamp into the set of slots causes a tab within the first slot to engage a locking arm of the clamp or extend into an opening in the locking arm.

* * * * *

UNITED STATES PATENT AND TRADEMARK OFFICE
CERTIFICATE OF CORRECTION

PATENT NO. : 12,212,128 B2
APPLICATION NO. : 18/508466
DATED : January 28, 2025
INVENTOR(S) : Scott Ernest Anderson Page 1 of 1

It is certified that error appears in the above-identified patent and that said Letters Patent is hereby corrected as shown below:

On the Title Page

Item (73) Assignee:, "BRICO" should be --ERICO--.

Signed and Sealed this
First Day of April, 2025

Coke Morgan Stewart
*Acting Director of the United States Patent and Trademark Office*